(12) United States Patent
Zuardy et al.

(10) Patent No.: US 9,481,116 B2
(45) Date of Patent: Nov. 1, 2016

(54) METHOD AND MANUFACTURING DEVICE FOR MANUFACTURING A FIBER COMPOUND SANDWICH COMPONENT

(71) Applicant: Airbus Operations GmbH, Hamburg (DE)

(72) Inventors: Ichwan Muhammad Zuardy, Hamburg (DE); Pierre C. Zahlen, Stade (DE); Karim Grase, Hamburg (DE); Claudio B. Vultaggio, Hamburg (DE); Axel Siegfried Herrmann, Stade (DE)

(73) Assignee: Airbus Operations GmbH, Hamburg (DE)

( * ) Notice: Subject to any disclaimer, the term of this patent is extended or adjusted under 35 U.S.C. 154(b) by 540 days.

(21) Appl. No.: 13/777,299

(22) Filed: Feb. 26, 2013

(65) Prior Publication Data

US 2013/0234373 A1   Sep. 12, 2013

Related U.S. Application Data

(63) Continuation of application No. PCT/EP2011/004284, filed on Aug. 26, 2011.

(60) Provisional application No. 61/377,234, filed on Aug. 26, 2010.

(30) Foreign Application Priority Data

Aug. 26, 2010   (DE) .......................... 10 2010 035 493

(51) Int. Cl.
*B29C 43/18*     (2006.01)
*B29C 33/10*     (2006.01)
(Continued)

(52) U.S. Cl.
CPC ............... *B29C 43/18* (2013.01); *B29C 33/10* (2013.01); *B29C 33/30* (2013.01); *B29C 70/086* (2013.01); *B29C 70/48* (2013.01); *B29C 70/86* (2013.01); *B29K 2715/003* (2013.01)

(58) Field of Classification Search
None
See application file for complete search history.

(56) References Cited

U.S. PATENT DOCUMENTS 5,686,038 A    11/1997 Christensen et al.
6,679,969 B1 *  1/2004 Fournier et al. .............. 156/245

(Continued)

FOREIGN PATENT DOCUMENTS

DE   10 2005 003 713 A1   7/2006
DE   10 2007 039 126 A1   2/2009

(Continued)

OTHER PUBLICATIONS

German Office Action for Application No. 10 2010 035 493.7 dated May 6, 2015.
European Office Action for Application No. 11 755 000.4 dated Mar. 18, 2016.

(Continued)

*Primary Examiner* — Monica Huson
(74) *Attorney, Agent, or Firm* — Jenkins, Wilson, Taylor & Hunt, P.A.

(57) ABSTRACT

The invention relates to methods and to a manufacturing device for manufacturing a sandwich component. A semi-finished product arrangement is soaked with a flowable matrix material, for example a resin, in particular by an infusion method. By using the method of the invention, inherent tensile stresses introduced by the respective method and remaining in the sandwich component to be manufactured are reduced, and moreover the risk of crack formation in the course of the process, afterwards and during operation of the sandwich component is minimized.

18 Claims, 12 Drawing Sheets

(51) Int. Cl.
*B29C 33/30* (2006.01)
*B29C 70/08* (2006.01)
*B29C 70/48* (2006.01)
*B29C 70/86* (2006.01)

(56) References Cited

U.S. PATENT DOCUMENTS

| | | | |
|---|---|---|---|
| 7,275,583 B2 | 10/2007 | Eisen | |
| 2008/0127584 A1* | 6/2008 | Schiffmann | B29C 70/443 52/293.3 |
| 2008/0128938 A1* | 6/2008 | Boutefeu et al. | 264/45.1 |
| 2009/0321009 A1* | 12/2009 | Hesse et al. | 156/285 |
| 2011/0006460 A1* | 1/2011 | Vander Wel et al. | 264/403 |

FOREIGN PATENT DOCUMENTS

| | | |
|---|---|---|
| DE | 10 2009 010 692 A1 | 12/2009 |
| EP | 1 524 048 | 4/2005 |
| JP | 01 014 014 | 1/1989 |
| WO | WO 02/074469 A2 | 9/2002 |
| WO | WO 2006/064167 A1 | 6/2006 |
| WO | WO 2007/088495 A1 | 8/2007 |
| WO | WO 2010/007162 A1 | 1/2010 |
| WO | WO 2012/025241 A2 | 3/2012 |
| WO | WO 2012/025241 A3 | 3/2012 |

OTHER PUBLICATIONS

International Search Report for Application No. PCT/EP2011/004284 dated Feb. 17, 2012.

* cited by examiner

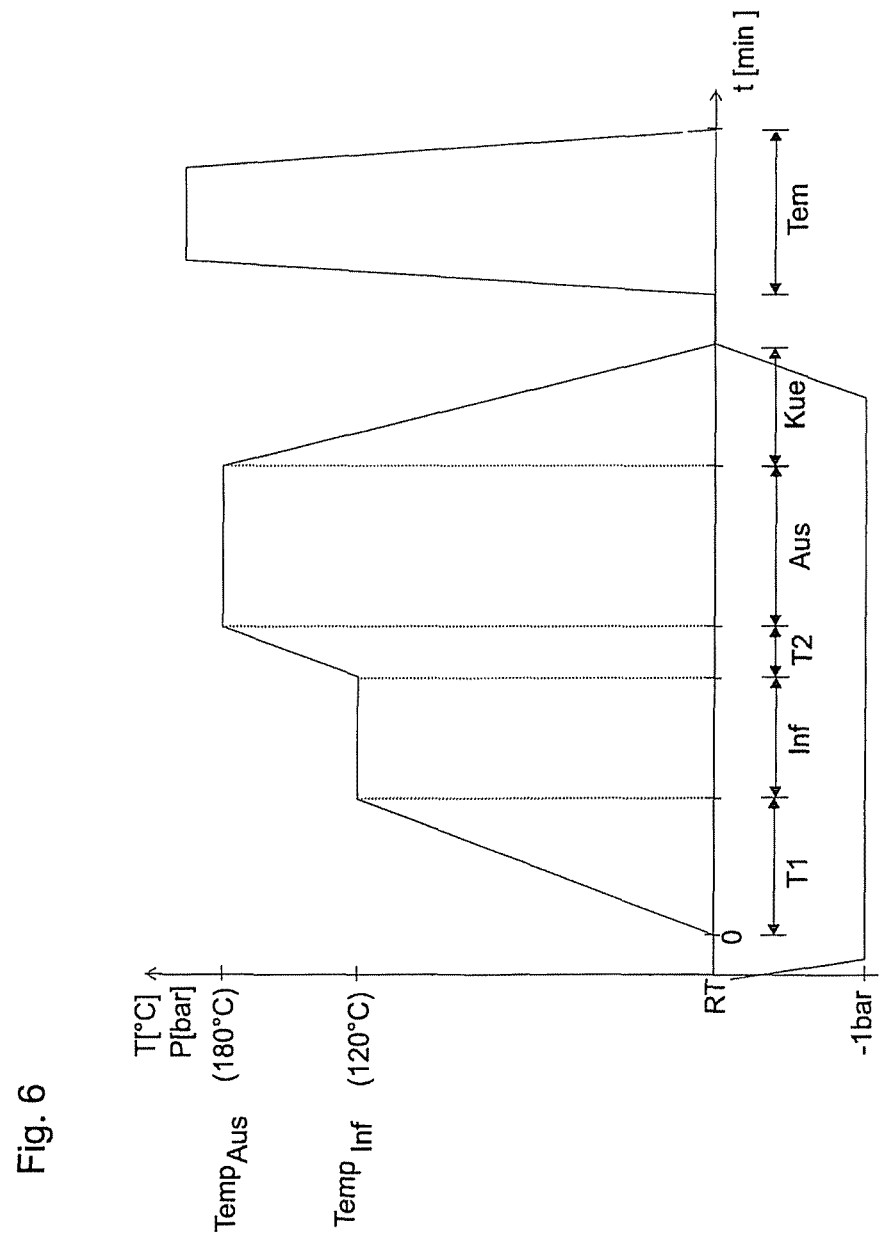

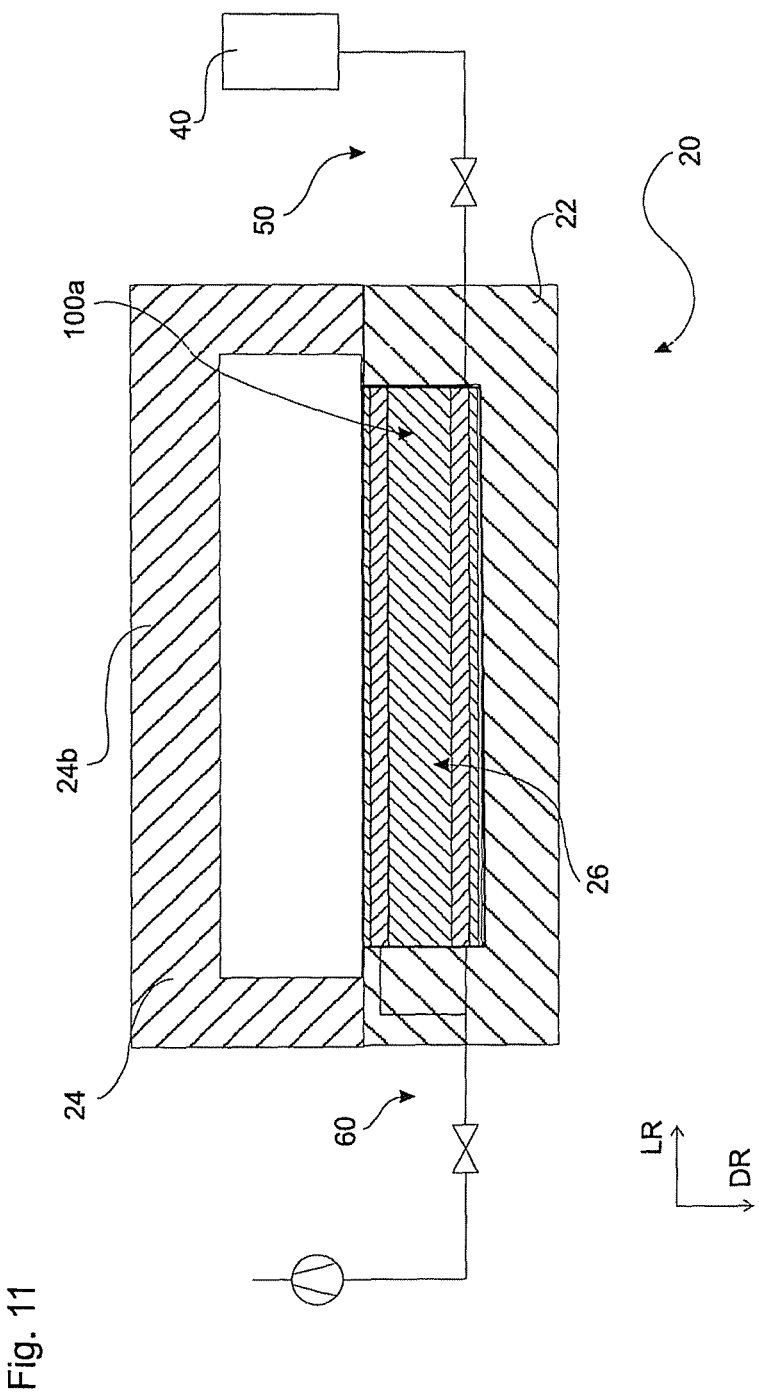

METHOD AND MANUFACTURING DEVICE FOR MANUFACTURING A FIBER COMPOUND SANDWICH COMPONENT

CROSS-REFERENCE TO RELATED APPLICATIONS

This application is a continuation application of and claims priority to PCT application No. PCT/EP2011/004284, filed Aug. 26, 2011, which claims priority to German Patent Application serial No. DE 10 2010 035 493.7, filed Aug. 26, 2010, and to U.S. Provisional Application Ser. No. 61/377,234, filed Aug. 26, 2010.

TECHNICAL FIELD

The invention relates to a method and a manufacturing device for manufacturing a fiber compound sandwich component as well as a corresponding manufacturing device.

BACKGROUND

Methods and devices for manufacturing components by soaking with a flowable matrix material are fundamentally known. They are employed, e.g., for soaking monolithic components such as, for instance, dry fiber composite semi-finished products, so-called preforms, with a matrix material such as, e.g., resin. Alike method is known, for instance, as a so-called Resin Film Infusion (RFI) method in which, for example, dry carbon fibers (CFRP). CFRP tissues or CFRP fabrics are inserted in a curing device and applied from the outside with a defined quantity of non-liquid resin film. Under the influence of pressure and temperature the corresponding resin fabric liquefies while soaking the previously applied carbon fibers or the tissue or fabric, respectively.

This known method has already been developed further by using liquid resin for soaking the tissue or fabric. Besides injection methods for the resin that have to employ very high pressure, in particular injection pressures of greater than 6 bar, a so-called "infusion method" in various configurations is already known for manufacturing components by flowable matrix material. Such infusion methods are known, for example, under the terms VARTM (Vacuum Assisted Resin Transfer Molding), MVI (Modified Vacuum Infusion), SCRIMP (Seemann Composite Resin Infusion Molding Process), CAPRI (Controlled Atmospheric Pressure Resin Infusion Process), or VAP (Vacuum Assisted Process). All of these processes have in common that a dry semifinished product tissue or fabric, for example a tissue of CFRP, is inserted in an open tool and covered by a flowing aid and optionally a semi-permeable membrane or sheet above the latter. This membrane is semi-permeable and thus gas-permeable but impermeable to matrix material. Above this a further sheet is draped which—in addition to the imperme-ability to matrix material—is furthermore gas-impermeable. It is possible to apply a vacuum between these two sheets, so that matrix material that is infused into the inner space, in particular into the flowing aid, is drawn through the fabric or tissue equally positioned in the inner space, to thus soak the latter transversely to the main direction of flow. The infusion process basically has the advantage of requiring to work with negative pressure exclusively, so that it is possible to avoid costly and constructively complex tools which must withstand an overpressure that had been necessary, for example, in the previously used injection process.

In the framework of the development of components, in particular main load-bearing components such as, e.g., in aircraft construction, it has meanwhile become desirable to produce double-layer structural or sandwich components in order to save weight. These are to present a sandwich structure, wherein an upper and a lower skin layer is formed of a semifinished product tissue having the form of dry fabrics, for example CFRP fabrics or tissues, are formed by soaking the latter with a flowable matrix material. In between, in the manner of a core of the sandwich structure, as it were, a foam core is to be formed of a previously inserted core layer. Here the connection of the individual layers among each other is also brought about by a flowable matrix material, namely, by connection layers which form in the course of curing of the matrix material. In order to further improve the like sandwich structures with regard to the reception of loads and damage tolerance capability, attempts are also undertaken to reinforce the core layer and/or the individual skin layers with reinforcement devices. These are, for example, pin-type reinforcements that extend at least through the core layer.

In the manufacture of sandwich components by the known infusion processes it was, however, found that cracks form when sandwich components manufactured in this way are subjected to loads and lead to a defect of such a sandwich component. Moreover, changes in the material and cracks, or capillary fissures, were found even directly after the manufacturing process in the section of the sandwich com-ponent. Such an increased susceptibility to cracking is not acceptable for sandwich components in their use, in particular in the field of aircraft industry. In addition it was found that the reinforcement devices such as the pins, for example, are partly impaired due to buckling during the manufacturing process, whereby even the reinforcement properties of the sandwich components showed negative changes.

From DE 10 2005 003 713 A1 a method for manufacturing fiber-reinforced hollow core sandwich components in a vacuum-supported resin infusion process is known. Here an open-cell core material such as, e.g., a honeycomb core with two resin systems is used, wherein the first resin acts as a separating sheet which prevents penetration of the second resin into the honeycomb cells.

From WO 2010/007162 A1 a method for manufacturing a hollow body such as, e.g., a pipe of fiber-reinforced plastic is known, wherein a carrier is used on which reinforcing fibers are disposed and then molded with a plastic matrix. Subsequently the carrier is dissolved in a liquid in order to separate it from the finished hollow body.

From DE 10 2009 010 692 A1 a device for carrying out a RTM method for the manufacture of a structural component is known. This device comprises a process sensing mechanism including a thermal sensor allowing to monitor the manufacturing process.

From DE 10 2007 039 126 A1 a compound panel including honeycombs and an apparatus for its manufacture of SMC is known. The apparatus comprises a press. The press comprises two guide rods carried by a bottom part which carry a pressing cylinder and wherein a pressing die acted upon by the pressing cylinder and the piston thereof is guided, which in turn carries a tool upper part cooperating with a tool lower part seated on the bottom part.

SUMMARY

It is an object of the present invention to remedy the drawbacks discussed in the foregoing. In particular it is an object of the present invention to provide a method whereby a defect-free sandwich component may be manufactured in a reliable and economical manner.

It is furthermore an object of the present invention to provide a method allowing to manufacture a sandwich component which is free of inherent stress depending on the intended application, or the inherent stresses of which may be adjusted to the respective application.

It is moreover an object of the present invention to provide a manufacturing device for manufacturing a sandwich component in accordance with a method of the invention.

The above objects are achieved through a method having the features of independent claim 1 or 4 well as through a manufacturing device having the features of independent claim 13. Further embodiments result in particular from the sub-claims appended to the respective independent claims.

In accordance with the invention, a semifinished product arrangement is soaked with a flowable matrix material, for example a resin, in particular by an infusion method. The semifinished product arrangement includes a core layer which consists in particular of a closed-cell rigid foam, i.e. a rigid foam having closed pores. The matrix material used has a working temperature clearly above the ambient temperature, e.g. in a range from 60° C. to 200° C. Accordingly this is a matrix material which is to be worked in the hot condition, as compared to matrix materials that may be worked cold, at temperatures in the range of the ambient temperature, i.e. that may be infused. The utilization of such matrix materials allows the manufacture of particularly high-quality sandwich components for the aircraft industry that may be employed in a particularly wide range of temperatures. By using the method of the invention, inherent tensile stresses introduced by the method and remaining in the sandwich component to be produced are reduced, and in addition the risk of crack formation in the course of the method, afterwards, and during operation of the sandwich component is minimized. Due to the solutions of the invention, the simplicity of the infusion method for manufacturing a sandwich component for sandwich structures is made applicable without the occurrence of impairments in the form of increased susceptibility to cracking or crack formation or buckling of reinforcement devices optionally incorporated in the sandwich component.

A method of the invention for manufacturing a defect-free sandwich component therefore includes the following steps:
inserting a semifinished product arrangement of two layers of at least one dry semifinished product tissue each and a core layer between these fabrics, in particular of closed-cell rigid foam, as starting materials of the sandwich component in a tool device,
in a first heating phase, heating the semifinished product arrangement to an infusion temperature,
introducing a matrix material flowable at the infusion temperature into the semifinished product arrangement during the infusion phase,
in a second heating phase, stepwise temperature increase of the semifinished product arrangement to a curing temperature in partial steps, so that each partial step presents a temperature increasing portion and a temperature holding portion so as to achieve a temperature equalization within the semifinished product arrangement,
at least partial curing of the introduced matrix material during a curing phase before, during and/or after the second heating phase for the formation of the skin layers at least of parts of the dry semifinished product tissues and of a connection area for the full-surface connection of the core layer and the skin layers at least in portions thereof,
cooling the semifinished product arrangement to ambient temperature.

The defect-free sandwich component manufactured with this method is a high-quality component, for due to the step-shaped temperature profile provided in accordance with the invention, in particular temporary inherent tensile stresses do not occur during the process, such as inherent stresses between the foam core and the outer skins or cover layers formed of the dry semifinished product tissues.

Due to the above method—in the following also referred to as a "quasi-stationary temperature method", it is possible to employ a sandwich structure for the manufacture of a sandwich component, and to concurrently reduce to minimum the likelihood of crack formation or the development of inherent tensile stresses liable to result in instances of overstretching or material degradation, particularly in the foam core of the sandwich component represented by the core layer. In particular it is thus possible in a reliable manner to manufacture a defect-free sandwich component having reduced inherent tensile stresses. This is ensured by the fact that particularly during the second heating phase, i.e. following the introduction of the flowable matrix material, the temperature is increased stepwise but not continuously. Each partial step of this stepwise temperature increase includes a temperature increasing portion and a temperature holding portion, wherein the temperature increasing step may be, e.g., a temperature increase by 5° C. in approx. 2 minutes, and the temperature holding step a holding time, e.g., of 15 minutes. For example, the temperature change rate during the temperature raising step may be in the range from 1° C./min to 4° C./min, depending on the sensitivity of the oven control, with the temperature being raised by 1° C. to 10° C. during the temperature raising step. The temperature holding step, on the other hand, may be 2 to 10 times as long as the temperature raising step. During the temperature holding step, the temperature may remain substantially constant or increase or decrease slightly, e.g. at a temperature change rate of less than 1° C./min. In this way a temperature equalization, in particular in the core layer or in the foam core formed by the core layer, is achieved. "Temperature equalization" should here be understood to the effect of a substantially uniform temperature prevailing across the volume in question. In particular, ranges having a particularly great temperature difference from adjacent areas should be avoided. In other words, no temperature gradients or only very low temperature gradients are present across the extension of the volume in question. This is achieved due to the stepwise heating, as time for the distribution of the introduced amount of heat is provided after every heating step, thus preventing the development of large temperature gradients. Ideally, the heating-up interval and the temperature jump are therefore correlated with the subsequent holding interval for the temperature reached. The greater the heating-up step and/or the greater the thermal inertia of the volume in consideration, the longer the time for the corresponding holding step, i.e. the holding interval, must be selected.

The method of the invention as described in the foregoing may also be applied to injection methods, i.e., methods of pressurized injection of the flowable matrix material into the semifinished product arrangement. Advantageously and particularly in the case of large-surface sandwich components, however, infusion methods are also employed here in order to limit the cost expenditure for the generation of the overpressures otherwise required, as well as the accompanying constructive complexity of the tool device.

Due to the avoidance of large temperature gradients inside the volume under consideration, in particular in the foam core of the sandwich component formed by the core layer, corresponding inherent tensile stresses caused by the temperature difference are reduced. Here it is insignificant for the cause of cracks whether the inherent tensile stress is present only temporarily, i.e. during the process, or is generally introduced into the sandwich component by the process and remains there. The method of the invention ensures at least a reduction of the inherent tensile stresses otherwise generated due to temperature gradients in the volume under consideration, and of the resulting cracks which ensue due to a deterioration of the characteristic values of the material and overstretching of the material, in particular of the foam core formed by the core layer. A sandwich component manufactured in accordance with the invention therefore has a high likelihood of being free of cracks or defects, whereby not only the refuse of the method is reduced, but also the operation of the sandwich component manufactured in this way becomes safer.

In a quasi-stationary temperature method in accordance with the invention, the temperature increase of the semifinished product arrangement takes place stepwise in partial steps at least in the second heating phase, so that each partial step includes a temperature increasing portion and a temperature holding portion in order to achieve a temperature equalization within the semifinished product arrangement. In other words, a zigzag-shaped development or a step-shaped development of a temperature curve is created which is observed in particular during the second heating phase. It is, of course, i.e. possible to apply such a stepwise development already in the first heating phase, i.e., while heating the dry semifinished product arrangement to infusion temperature. By way of example, an increase rate of 5° Celsius per two minutes should then be provided for each temperature increasing portion, wherein after every two minutes a holding phase, i.e. a temperature holding portion of fifteen minutes, is observed at the temperature reached. Observing step-shaped holding phases in a method of the invention presents the advantage that in this way, an appropriate temperature equalization may take place inside the semifinished product. In other words one waits until the amount of heat introduced from outside has reached a homogeneous temperature profile inside the semifinished product. Hereby it is ensured that the individual areas, or the individual portions of the semifinished product arrangement, in particular of the core layer, will heat up substantially uniformly. This manner of proceeding is particularly sensible in the case of core layers having reinforcement devices, in particular in the direction of thickness. Owing to reinforcement devices, for example of CFRP material, the thermal conduction through the core layer is inhomogeneous at least in areas thereof. The reinforcement devices may serve as thermal bridges, so that heat is transported more quickly along the reinforcement devices in deeper core layer areas with regard to their thickness direction than in areas of the core layer lacking a reinforcement device. In this way, different temperatures are generated at a core depth of the core layer, so that a temperature gradient from volume element to volume element of the core layer may be created within this depth. These temperature gradients may cause instances of overstretching to occur inside the foam. Such instances of overstretching are a drawback particularly if they bring about deformations of the incorporated reinforcement devices. Deformation or also overstretching, or displacements of incorporated reinforcement devices are to be avoided, for in this way the desired stress resistances of a sandwich component can not be attained in the desired and predefined manner. Due to the stepwise heating, in particular during the second heating phase, temperature gradients may essentially be avoided in this manner, or may be limited to a maximum value that will not result in overstretching or displacement inside the core layer. In other words, although accepting the drawback of the total process duration becoming longer, the better temperature equalization nevertheless obtains the advantage of better being able to meet the predefinition of the stress properties of the sandwich component through a method of the invention.

A quasi-stationary temperature method of the invention may fundamentally be employed for any forms of so-called "wet processes" (Liquid Composite Moulding; LCM). This also covers injection methods for matrix materials, for example Resin Transfer Moulding (RTM) or Resin Injection Moulding (RIM). For all of such processes it is crucial that the matrix material be present in a flowable shape. This differentiates the like methods from "dry processes" operating with pre-impregnated layers, so-called "prepregs."

It may be advantageous if the method described in the foregoing is carried out such that the introduction of the flowable matrix material into the dry semifinished product arrangement is effected by negative pressure. In other words, advantageously an infusion method is employed to carry out the introduction of the flowable matrix material. As was already explained, it is possible in this way to do away with complex constructions for an injection process for the introduction of the flowable matrix material. In order to be able to carry this out, the semifinished product arrangement must be provided with a flowing aid and surrounded by an arrangement of sheets, in particular an arrangement of sheets as will be described later on as a semi-permeable arrangement of sheets. Alternatively it is also possible to use overpressure for the introduction of the flowable matrix material. In other words, a so-called injection process is thus performed. With such a process type it is also possible through the temperature regulation of the invention to achieve a reduction of the inherent tensile stresses in the produced sandwich component.

Another subject matter of the present invention is a method for manufacturing a sandwich structure part having low inherent tensile stress or having no inherent tensile stress, which includes the following steps:

inserting a semifinished product arrangement surrounded by an arrangement of sheets and consisting of two layers of at least one dry semifinished product tissue each and a core layer between these fabrics, in particular of closed-cell rigid foam by at least one flowing medium such as, e.g., a mat-shaped flowing aid, into a reception device of a tool device, wherein arranging in a tool cavity formed in the tool device is performed such that the volume available for the semifinished product arrangement is limited by a volume limitation device until at least the curing phase, in a first heating phase, heating the semifinished product arrangement to an infusion temperature and applying negative pressure to the inside of the enveloping arrangement of sheets while limiting the volume of the semifinished product arrangement, during or after the first heating phase, introducing a matrix material flowable at the infusion temperature into the semifinished product arrangement during the infusion phase via the flowing aids while maintaining the previously generated negative pressure and while limiting the volume of the semifinished product arrangement, performing a temperature holding interval after the first heating phase until the introduction of the flowable matrix material while maintaining the previously generated negative pressure and while limiting the volume of the semifinished product arrangement has been concluded, in order to at least partially cure the semifinished product arrangement during the curing phase before, during and/or after a second heating phase, further heating the semifinished product arrangement to a curing temperature which is higher than the infusion temperature, while maintaining the generated negative pressure and while limiting the volume of the semifinished product arrangement, performing a temperature holding interval after the second heating phase while limiting the volume of the semifinished product arrangement, cooling to ambient temperature during the cooling phase while limiting the volume of the semifinished product arrangement.

With the above method, which shall hereinbelow also be referred to as a "constant-volume method" of the invention, it is possible to use a sandwich structure for the manufacture of a sandwich component while nevertheless obtaining the advantages of the infusion method for the matrix material. The semifinished product arrangement includes a core layer consisting in particular of a closed-cell rigid foam, i.e. a rigid foam having closed pores. At the same time, the susceptibility to cracking during operation of a sandwich component produced in this way is reduced to a minimum, and the likelihood of reinforcement devices possibly disposed in the core layer being crushed is reduced to a minimum. This is ensured by the provision of a volume limiting device. Here the volume limiting device serves for limiting the volume of the formed semifinished product arrangement. In other words, it is hereby ensured that the formed semifinished product arrangement will be substantially constant during the ongoing process at least until the curing phase of the matrix material. It is therefore possible to speak of a constant-volume method.

The limitation of the volume of the inserted semifinished product arrangement provides several advantages. One crucial advantage is that inherent tensile stresses possibly remaining within the manufactured product, i.e. the sandwich component, are reduced to a minimum. Such inherent tensile stresses usually form the starting point for the formation of cracks or at least for an intensified propagation of cracks already existing or forming in the core layer or in the foam core thereby formed. In accordance with the present invention, the avoidance of such inherent tensile stresses is achieved along the following principle. It is furthermore possible to specifically obtain or adjust a predetermined residual stress in the manufactured sandwich component by adjusting a predetermined pre-stress by the manufacturing device before or during the heating phase.

In previously known devices, an open tool is provided during infusion of the matrix material. The matrix material used has a working temperature clearly above the ambient temperature, e.g. in a range from 60° C. to 200° C. Accordingly this is a matrix material which is to be worked in the hot condition, as compared to matrix materials that may be worked cold, at temperatures in the range of the ambient temperature, i.e. that may be infused. The utilization of such matrix materials allows the manufacture of particularly high-quality sandwich components for the aircraft industry that may be employed in a particularly wide range of temperatures. As the single layers are heated for being infused with matrix material, an expansion of the single sandwich layers at the respective corresponding thermal expansion coefficients takes place in the application of a previously known infusion method to a sandwich structure having a core layer. The thermal expansion coefficients are usually different among materials. Particularly in the case of the materials customarily employed in aircraft construction for the skin layers on the one hand, such as CFRP fabrics or tissues, and for intermediately arranged core layers for the formation of a foam core on the other hand, the thermal expansion coefficients are highly different. Thus, the core layers used usually exhibit a relatively high expansion (e.g., thermal expansion coefficients from 30 to 40×10 exp-6 1/° C.), while the surrounding skin layers virtually do not exhibit any expansion owing to very low thermal expansion coefficients (e.g., thermal expansion coefficients from approx. 2 to 3×10 exp-7 1/° C.). In other words, the expansion volumes of the single layers due to temperature change differ relatively strongly from each other.

This means that the core layer already expands more strongly during heating up to an infusion temperature, i.e. during the first heating phase, than is true for the semifinished product tissues intended to form the respective skin layer. At the time of infusing the matrix material, the core layer is thus in a first expanded state, while the two semifinished product tissues for the formation of the two skin layers substantially do not exhibit an additional expansion volume. Subsequently further heating takes place in a second heating phase, so that an even higher temperature, namely the curing temperature, brings about even further expansion of the core layer. In other words, at the time of curing the volume of the core layer is increased further by the further increased temperature, while the volumes of the semifinished product tissues for the formation of the skin layers remained substantially unchanged. Here the temperature profile is predetermined by the material of the flowable matrix material and can not be adapted, or only in a very low degree, to the expansion situation described in the foregoing.

In the expansion situation of the curing temperature, the matrix material is cured in the application of previously known infusion methods and constitutes the connection between the core layer and the skin layers which are equally formed by the curing process. In particular, the skin layers directly connect to each other at the marginal areas of the sandwich component to thus form, as it were, monolithic marginal areas. At any rate, however, a material connection of the two skin layers takes place at the marginal areas of the sandwich component, so that a mechanically stable structure which does not admit a contraction of the core layer is predetermined by the skin layers soaked with cured matrix material. If, now, at the conclusion of the method the cooling process is performed down to ambient temperature, the core layer or the foam core already having been formed by the core layer at this time attempts to contract again to the volume corresponding to the ambient temperature. At this time the core layer or foam core has, however, already entered into a cured connection with the skin layers and with reinforcement devices possibly present in the core layer. In other words, the cured skin layers as well as the cured matrix of the matrix material and—where present—the reinforcement devices stabilize the core layer in the expanded state. In this way the core layer is prevented from contracting as desired in accordance with the temperature profile during cooling down. The prevented contraction brings about inherent tensile stresses in the core layer, which in this case make themselves felt as a tensile stress in the material of the core layer or of the foam core, respectively. These tensile stresses are present in the core layer or in the foam core unless the latter is again heated to the infusion temperature. As the infusion temperature is practically never reached during the use of such sandwich components, for example 80° C. at the most with insolation, but rather even temperatures below ambient temperature as low as minus 55° Celsius in the case of aircraft, one should rather expect an even more pronounced occurrence of such inherent tensile stresses during operation. These inherent tensile stresses would result in the causation of material flaws already during the cooling phase of the method or shortly thereafter. Even already existing cracks, or cracks formed later on in the course of the operation of the sandwich components, are influenced negatively by the existing inherent tensile stresses. In the event of an existing crack, an existing inherent tensile stress exacerbates the risk of an increased notch stress at the tip of the crack, so that crack propagation is generated or accelerated in the event of an increased notch stress.

The process is changed fundamentally during the two heating phases due to the utilization of a volume limitation device. Thus all layers are heated, however the expansion of all layers is limited. In particular the volume expansion of the core layer is limited. The limitation advantageously applies to the starting volume at ambient temperature. In other words, the limitation of the volume and the heating create inherent compressive stresses in the material of the core layer, for the latter tends to expand due to the increase of temperature for infusion and the further increase for curing. This expansion is prevented by the volume limitation device, so that an equilibrium of forces manifests between the volume limitation device and the core layer attempting to expand. On the one hand, this equilibrium of forces is applied by the volume limitation device as an opposed force, whereas an inherent compressive stress is introduced or applied from the core layer on account of the missing possibility to deform and expand. In other words, the core layer is placed under inherent compressive stress during the two heating phases as well as in the infusion phase and the curing phase. This inherent compressive stress is, however, distributed substantially homogeneously as a function of the temperature distribution in the core layer, so that inherent compressive stress gradients are advantageously also avoided through the avoidance of temperature gradients. In addition, the inherent compressive stress, i.e. in the sense of a residual inherent compressive stress, has a crack-inhibiting effect in case there exists a crack initiation originating from the previous material treatment.

In the curing phase the matrix material is cured so as to form the skin layers and to connect the skin layers to the core layer in a volume situation in which the core layer has virtually no expansion while being subjected, however, to inherent compressive stress. The subsequent cooling thus does not bring about any change in the volume but step by step lowers the inherent compressive stress present in the core layer by the reduction in temperature. As the volume limitation device already has limited the volume at the time of initial heating, it is to be expected that any inherent compressive stresses inside the core layer have furthermore been relaxed after complete cooling down to the starting temperature, i.e. in particular to ambient temperature. In contrast with the method without a volume limitation device that was described in a preceding paragraph, the present invention thus does accept an inherent compressive stress, in particular a homogeneously distributed one, in the core layer in the course of the method, however in the finished sandwich component a core layer or a foam core thereby formed is being provided which is present substantially without inherent tensile stresses in the material. The avoidance, or reduction to a minimum, of inherent tensile stresses in the material of the core layer allows to equally minimize the susceptibility to cracking and the probability of defects during operation of a sandwich component manufactured in this way.

The arrangement of sheets in a method of the invention may be both a single, for instance sack-type sheet, or also a plurality of single sheets. The sum of the arrangement of all sheets results in the formation of the arrangement of sheets having the desired semi-permeability properties, i.e. the gas permeability and the impermeability to matrix material. For the purpose of generating negative pressure a port may be provided through which the negative pressure is generated and the negative pressure in the semifinished product arrangement is generated through the gas-permeable arrangement of sheets. For the purpose of introducing the flowable matrix material to the inside of the arrangement of sheets, a sprue device may be provided through which the matrix material may be introduced to the interior of the arrangement of sheets while bypassing the barrier of the latter. The arrangement of sheets may envelop the semifinished wrap product arrangement substantially completely or in turn only partly, so that the desired sealing by further components such as, e.g., the reception device is assured.

It may be advantageous if in a constant-volume method of the invention and/or in a quasi-stationary temperature method of the invention the application of negative pressure to the interior of the arrangement of sheets already takes place prior to the introduction of the flowable matrix material so as to immobilize the semifinished product arrangement. In other words, in this way the final position of the individual semifinished product tissues and of the core layer relative to each other is defined. Owing to the application of the negative pressure even prior to the introduction of the matrix material the semifinished product tissues and the core layer are, as it were, suctioned in the desired position, i.e. the arranged position, so that shifting or slipping may be avoided with a higher likelihood until the introduction of the matrix material. In this way it may be ensured that the desired position of each layer and also the desired orientation, for instance of single fibers in the semifinished product tissues, in the finished sandwich component is secured.

It may be advantageous if in the framework of the present invention the volume limitation device is an upper covering device which is adapted to be placed on the reception device such that the tool cavity formed therebetween accommodates the semifinished product arrangement, the flowing aids, and the arrangement of sheets substantially without play. Accommodation without play here means that the tool cavity corresponds in its dimensions at least in the direction of thickness of the core layer to the corresponding dimension of the semifinished product arrangement, the flowing aids, and the arrangement of sheets. In other words such an embodiment is a volume limitation device representing a substantially closed tool device. The closure of the tool device is obtained by placing the upper covering device, wherein the closure is provided in particular in the direction of thickness of the core layer. Especially in the direction of thickness a support or volume limitation of the expansion of the core layer is particularly sensible, for inherent tensile stresses introduced in this direction would be correlated in a particularly negative manner with corresponding crack formations. Accordingly, a limitation of the volume in this direction is highly advantageous because corresponding inherent tensile stresses that would be particularly detrimental in this direction are reduced in this way. The closed tool, i.e. the configuration of the upper covering device and the reception device, may of course also be such that in substantially all directions a contact exists between the reception device, or the upper covering device and the layers of the semifinished product arrangement arranged therein, as well as the flowing aids, or the arrangement of sheets.

It should be noted that although this is a matter of a closed tool, an infusion method for the introduction and thus the infusion of matrix material is nevertheless being employed. In particular, in comparison with a variant comprising an overpressure device there is no necessity for a chamber or air pressure which is applied actively and above all in a controlled manner. It is rather sufficient if the tool cavity, which is formed between the reception devices and the upper covering device, is subjected to a negative pressure so that the matrix material infusion may be carried out in the known manner of infusion methods. Besides the more simple configuration of the required device for such a method, the omission of an overpressure device made possible in this way has the advantage that a control of an overpressure for creating the temperature-dependent equilibrium of forces is not necessary. The equilibrium of forces rather manifests automatically, in a manner of speaking, in the geschlossenen tool without a control being required. This eliminates the influence of control inaccuracies on the quality of the sandwich component to be manufactured.

It may be advantageous if the internal pressure or the compressive strain in the individual materials of the semifinished product arrangement and/or of the flowing aid and/or of the arrangement of sheets brought about by placing the upper covering device on the lower reception device is limited to no more than 0.3 bar, in particular to lower values, for example 0.1 bar or even 0.01 bar. This accordingly means that the internal dimension of the tool cavity formed by the reception device and the upper covering device is somewhat smaller than the external dimensions of the inserted semifinished product arrangement, the inserted flowing aid, and the arrangement of sheets. In other words, the inserted elements are compressed quite gently in the resulting tool cavity. Such compression is, however, a minimum of a compression that is not comparable to those injection methods applying more than 6 bar internal pressure on the corresponding cavity and the elements placed therein. In a sense, the tool device thus provides a tool cavity having a dimension slightly smaller than specified, so that an expansion particularly of the core layer during the process is in any case prevented. The expression "free of play" as used in the present application should be understood to be such a configuration, i.e. a dimension smaller than specified, with a limitation of the internal pressure resulting in the material due to placement to 0.3 bar.

As a result of the volume limitation device, the limitation of the volume in a constant-volume method in accordance with the invention may be realized constructively in a variety of ways. It is possible for the volume limitation device to comprise at least one overpressure device for temperature-dependent pressure control in which the lower reception device together with the semifinished product arrangement accommodated therein and the flowing aids as well as the arrangement of sheets is arranged, so that the semifinished product arrangement, the flowing aids, and the arrangement of sheets are subjected to a temperature-dependent pressure during the process. It is thus possible that the volume limitation device is formed by an overpressure device, for example an autoclave, which concurrently provides the necessary temperature increase in the two heating phases. Here the generation of an overpressure takes place as a function of the expected volume expansion of the core layer relative to the corresponding respective temperature. It is thus possible, having knowledge of the material properties of the core layer used, to give a statement concerning what volume expansion should be expected for what temperature. If, now, it is desired to limit the volume to the starting volume in the framework of the present invention, then a opposing force preventing such expansion must be applied, for example by overpressure. In such an embodiment, opposing pressure is therefore applied correspondingly during the single heating phases by the volume limitation device, so concurrently with a rising temperature, a rising limitation pressure is opposed to the rising expansion tendency of the core layer as an opposing force. In other words, the pressure is controlled as a function of the temperature and thus indirectly in dependence on the respective volume expansion of the core layer. Hereby it is possible to prevent the volume expansion of the core layer and create, as it were, a constant-volume method. The applied negative pressure assists the applied overpressure, so that lastly even the addition of overpressure and negative pressure is jointly available for the necessary equilibrium of forces for limiting the volume.

It is furthermore possible that the volume limitation device is in direct contact with a portion or with a larger surface or the entire surface of the semifinished product inserted in the lower reception device. In particular, this contact is directly or indirectly a force-fit contact which may apply force by a press as an opposing force against the expansion force of the core layer and thus against the expansion force of the semifinished product. In the case of such a press, too, it is necessary that the pressing force is adapted to the respective temperature situation and the correspondingly respective expansion force situation of the core layer and thus of the semifinished product, or that the pressing device is positioned on the semifinished product arrangement final dimension or starting volume. One drawback of the press is that the size of the working space provided by the pressing blocks of the press and the possibility of temperature regulation thereof is limited, no that large-surface sandwich components can not be accommodated. Another possibility, which will be explained in more detail in the following, is for the volume limitation device to comprise an upper covering device providing a substantially closed tool for the manufacture of the sandwich component which is configured for accommodating the dry semifinished product arrangement substantially without play.

Furthermore it is possible that following cooling to ambient temperature in direct temporal succession or at a certain temporal distance a so-called tempering process is performed. The tempering process means that a further heating step of the manufactured sandwich component takes the latter to a tempering temperature which is in particular above the curing temperature. Such a step need not inevitably take place in the same tool and thus not in the same tool device as the method of the invention. By the tempering process it is possible to obtain finalizing curing of the matrix material. The use of a subsequent tempering step allows to design the curing step in a method of the invention clearly shorter and thus save time in the costly and complex tool for carrying out a method of the invention. The tempering process may, e.g., take place in a vat with warmed fluid and may further be carried out simultaneously for several components.

The infusion phase of one of the methods of the invention is advantageously controlled at a temperature at which the matrix material as well as the tool device and thus the semifinished product have a substantially identical temperature. In particular the identical temperature as a so-called infusion temperature is greater than 100° Celsius. For example it is possible that the infusion temperature used both for the matrix material and for the semifinished product is in a range between 110° Celsius and 120° Celsius. The infusion phase should particularly be understood to be the phase between the two heating phases. However the infusion of the flowable matrix material may, of course, start already at the end of the first heating phase and even extend into the first part of the second heating phase. Basically it is sensible to carry out the infusion phase as quickly as possible. The limiting value in terms of time for the infusion phase is the so-called potlife of the flowable matrix material, i.e. its maximum processing duration until curing to the extent that further processing is not possible any more. In other words, the curing process—i.e., for instance crosslinking of the matrix material—already starts during infusion thereof. Nevertheless the matrix material still remains workable as long as an excessively large part of the matrix material has not cured yet. Within this potlife the infusion phase has to be carried out. It may last, e.g., between 20 and 30 minutes.

In summary it may be said that it is possible, while preserving all of the advantages of the infusion method which may be carried out at low-cost and constructive simplicity, to also manufacture sandwich structures in the manner of the invention in order to produce sandwich components having reduced inherent tensile stress and susceptibility to cracking. The reduction of the inherent tensile stress brings about a higher cracking resistance, or a lower susceptibility to cracking, during use of sandwich components thus manufactured.

In a constant-volume method it may furthermore be an advantage if the temperature increase of the semifinished product arrangement at least in the second heating phase takes place stepwise in partial steps, so that each partial step includes a temperature increasing portion and a temperature holding portion in order to obtain a temperature equalization within the semifinished product arrangement. In other words, a zig-zag-shaped development or a step-shaped development of a temperature curve is created which is observed particularly during the second heating phase. Such a stepwise development may, of course, i.e. be utilized already in the first heating phase, i.e. while heating the dry semifinished product arrangement to infusion temperature. By way of example an increase rate of 5° Celsius per two minutes should then be provided for each temperature increasing portion, wherein after every two minutes a holding phase, i.e. a temperature holding portion of fifteen minutes at the reached temperature is observed. For example, the temperature change rate during the temperature raising step may be in the range from 1° C./min to 4° C./min, with the temperature being raised by 1° C. to 10° C. during the temperature raising step. The temperature holding step, on the other hand, may be 5 to 10 times as long as the temperature raising step. During the temperature holding step, the temperature may remain substantially constant or increase or decrease slightly, e.g. at a temperature change rate of less than 1° C./min. The observation of step-shaped holding phases in a method of the invention has the advantage that in this way a sufficient temperature equalization may take place on the inside of the semifinished product arrangement. In other words, one waits until the externally introduced amount of heat has reached a homogeneous temperature equalization can be achieved inside the semifinished product arrangement. Thus it is ensured that the single areas, or the single portions of the semifinished product arrangement, in particular the core layer, heat up substantially uniformly. In particular in the case of core layers including reinforcement devices, in particular in the direction of thickness, this manner of proceeding is sensible. On account of reinforcement devices, for example of CFRP material, the thermal conduction through the core layer is inhomogeneous at least in areas thereof. The reinforcement devices may serve as thermal bridges, so that in deeper core layer areas with regard to their thickness direction, heat is transported more quickly along the reinforcement devices than in areas of the core layer without reinforcement device. In this way different temperatures are brought about at a core depth of the core layer, so that a temperature gradient from volume element to volume element of the core layer may come about at this depth level. In a closed tool, but also in any other configuration of a volume limitation device of the invention, these temperature gradients may cause crushing to take place inside the foam. Such crushing is a drawback particularly if it brings about deformations of the introduced reinforcement devices. Deformation or also crushing, or shifting of introduced reinforcement devices must be avoided, for in this way it is not possible to obtain the desired load resistances by a sandwich component in the desired and previously defined manner. Due to the stepwise heating, in particular during the second heating phase, it is possible in this way to substantially avoid temperature gradients or limit them to a maximum value that does not cause crushing or shifting inside the core layer. In other words, while accepting the drawback of the overall process duration becoming longer, the better temperature equalization allows to obtain the advantage that the predefinition of the stress properties of the sandwich component may be preserved in an improved manner by the method of the invention.

In a constant-volume method of the invention, and also in a quasi-stationary temperature method of the invention it may furthermore be an advantage if the temperature reduction of the semifinished product arrangement in the cooling phase takes place stepwise in partial steps, so that each partial step includes a temperature reduction portion and a temperature holding portion in order to obtain a material relaxation within the semifinished product arrangement. For example, the temperature change rate during the temperature raising step may be in the range from 1° C./min to 4° C./min, with the temperature being reduced by 1° C. to 10° C. during the temperature raising step. The temperature holding step, on the other hand, may be 2 to 10 times as long as the temperature reducing step. During the temperature holding step, the temperature may remain substantially constant or increase or decrease slightly, e.g. at a temperature change rate of less than 1° C./min. Likewise, as was already explained in the preceding paragraph, in this way the temperature gradient being created during cooling inside the semifinished product arrangement, in particular inside the core layer or the foam core formed thereof, is reduced. In this way a material relaxation may take place.

At more rapid, stepless cooling, individual volume elements of the core layer might otherwise cool more rapidly than adjacent volume elements, thus bringing about different expansion situations due to different temperatures. As, however, the individual volume elements are fixedly connected to each other in the core layer, this would result in inherent tensile stresses liable to result in deformations of the core layer on its inside and thus in crushing or shifting of introduced reinforcement devices, or changes in characteristic values of the material of the core layer due to overstretching of the material, and thus result in cracks. The freshly formed connection with the skin layers via the introduced and cured matrix material might also be influenced negatively by such inherent tensile stresses. Particularly in the case of methods where final curing is to take place subsequently through a tempering process, stepwise cooling is advantageous as the curing process has not yet resulted in complete curing of the matrix material, e.g., complete crosslinking of polymerizing resin.

It may furthermore be an advantage if in a constant-volume method of the invention, and also in a quasi-stationary temperature method of the invention, the matrix material does not polymerize in the range between the ambient temperature and the infusion temperature. In other words, no curing of the matrix material would take place in the range between ambient temperature and infusion temperature. In this way it is ensured that in this temperature range, e.g. in the temperature range that may prevail at the most in the storage container for the matrix material, no curing, in particular no polymerization of the matrix material takes place. Furthermore it is hereby ensured that the resin is highly fluid at the infusion temperature because no curing has taken place in the preceding heating-up phase. The matrix material may be composed, for example, of up to three or more components. It is fundamentally possible for the matrix material to consist of only one component, namely a resin, e.g. an epoxy resin. Such a resin is marketed, e.g., as a resin system under the tradename RTM-6 by the company Hexcel and is usable for a method of the invention. Two-component matrix materials, for example a mixture of a resin and a curing agent, are conceivable. The curing agent serves to initiate the curing process and thus in particular to assist or start the polymerization of the resin and the associated curing. The addition of further components, for example a promoting agent, may equally be sensible. Such a promoting agent causes the resin and the curing agent to carry out the curing process, e.g. the polymerization, even more quickly. The entire method of the invention may thus be accelerated by accelerating the curing phase. An infusion temperature in a range between 80 and 120° Celsius is fundamentally considered to be advantageous. The infusion temperature does, however, depend on the respective matrix material used, in particular the properties of the respective mixture.

It may furthermore be advantageous if in a constant-volume method of the invention, as also in a quasi-stationary temperature method of the invention, a tear-off fabric is arranged between the flowing aids and the dry semifinished product tissues. Such a tear-off fabric, which is also referred to as a peel ply in literature, has the function of facilitating pulling (tearing) off the flowing aids filled with matrix material after carrying out the process. In other words, this ensures facilitated separation between flowing aid and manufactured sandwich component. This is achieved, for instance, in that the surface structure of the peel ply and/or an additional adhesion-preventing coating (such as, e.g., PTFE, silicon or the like) are provided. Typical materials to be named for this purpose are glass fabrics, nylon fabrics or the like. The peel ply must be gas-permeable and also permeable to the matrix material in two directions. Both the flowing aids and the peel ply may, of course, be formed substantially integrally with the upper covering device and/or the reception device. In this way it is not necessary to separately arrange the flowing aid and the tear-off, but these are taken into the desired position, jointly with the upper covering device and/or the reception device, by placing the upper covering device on the reception device.

Furthermore it may be advantageous if in a constant-volume method of the invention, as also in a quasi-stationary temperature method of the invention, during or before placing the upper covering device on the reception device, volume limitation elements are arranged in the longitudinal direction of the core layer in the tool cavity formed, in such a way that the dimensions of the cavity volume reduced by the inserted volume limitation elements correspond to the dimensions of the inserted dry semifinished product tissues and the core layer as well as the flowing aids and the arrangement of sheets substantially without play. In this way it is also possible to carry out an adaptation of the volume of the tool cavity in the longitudinal direction of the core layer with the aid of the volume limitation elements. This is a particularly simple embodiment for adapting the tool cavity to the desired final dimensions of the sandwich component. Thus it is possible to use a single lower reception device and a single upper covering device that is adapted to the thickness direction of the sandwich component. For different dimensions of the sandwich component in the longitudinal direction of the core layer it is possible to employ different volume limitation elements which reduce the cavity volume in the desired manner. The complex and thus costly reception device and upper covering device thus are to be provided once and may be varied by the volume limitation elements at a high degree of flexibility. Thus it is possible with a method of the invention to also manufacture a multiplicity of variously shaped sandwich components without major additional expenditure.

It may be advantageous if in a constant-volume method of the invention, as also in a quasi-stationary temperature method of the invention, the core layer is formed of at least one foam panel, wherein the core layer is formed with closed cells, i.e. the core layer has closed pores. This one foam panel may be produced in advance in a particularly simple manner vorab hergestellt werden. Providing more than one foam panel, for example several foam panels, for creating the core layer is also conceivable. When several foam panels are used for forming the core layer, they are arranged side by side, for example. It is, however, i.e. conceivable for several foam panels to be arranged on top of each other in order to form the core layer. Furthermore it is conceivable for foam panels to be arranged side by side and on top of each other, so that the nesting of the single foam panels already brings about a certain rigidity of the core layer. The use of single foam panels has the advantage that their size may be kept in such a dimension that they may be moved and maneuvered by a single operator. The foam panels are laid in contact with each other and thus also form large core layers without a complex handling device being necessary for this purpose. Each of the foam panels may be provided with one or several reinforcement devices. It is also possible in the framework of the present invention to arrange reinforcement devices between the foam panels when arranging the latter in order to form the core layer. Here the reinforcement devices are thus being arranged, as it were, at the abutting faces of the single foam panels in the longitudinal direction and/or in the direction of thickness of the core layer.

The core layer may also present honeycomb structures serving to mechanically stabilize the core layer and thus the sandwich component to be manufactured. Here a device should be provided which prevents flowable matrix material from penetrating to the inside of the honeycombs during the course of one of the methods of the invention. Hereby the weight of the sandwich component may be reduced further without clearly reducing the mechanical stability.

As was already addressed repeatedly, it may be an advantage in a constant-volume method of the invention, as also in a quasi-stationary temperature method of the invention, if reinforcement devices for increasing the damage tolerance during operation are arranged in the core layer. Such reinforcement devices are, for example, pins or other three-dimensional reinforcements which reinforce the core layer and thus the entire sandwich structure of the sandwich component by their shape and/or by their material. Increasing the damage tolerance during operation should here be understood as the use of the sandwich component, for example for lining structural components of an aircraft. The damage tolerance is increased to the effect that a defect of the sandwich component is not even brought about at higher introduced loads, for the inherent tensile stresses of the sandwich component are reduced, with the susceptibility to cracking thus being clearly minimized. Such reinforcement devices may, of course, i.e. be woven structures or elements inserted into the core layer in the form of so-called rovings.

It may also be advantageous if in a constant-volume method of the invention, as also in a quasi-stationary temperature method of the invention, the reinforcement devices are introduced along marginal portions of at least one foam panel. These marginal portions may be provided both in the case of a single foam panel forming a core layer, but also in the case of a core layer consisting of more than one foam panel. The marginal portions are portions of the foam panel that are subjected to particularly high loads during operation of a sandwich component. Accordingly, precisely these marginal portions are improved by a reinforcement device for increasing the damage tolerance. In one arrangement of the foam panels side by side and/or or on top of each other for forming the core layer, these marginal portions are, as it were, the volumes of the foam panels that are located directly at the abutting faces between the single foam panels, or that form the margin of the core layer.

A constant-volume method of the invention may advantageously be developed further in that inserting the semifinished product arrangement takes place with at least one core layer having been cooled to a temperature below the ambient temperature. In other words, at least the core layer is cooled to a temperature below the ambient temperature. Nevertheless, the entire semifinished product arrangement may be inserted while cooled in this manner.

Due to the cooled insertion of at least the core layer into the tool device, in particular by reception without play, the expansion volume of the core layer may be limited by the volume limitation device. In other words, the core layer is already limited in its volume expansion when it is heated to ambient temperature from the cooled state, so that inherent stresses occur in the core layer even at ambient temperature, in this case inherent compressive stress, i.e. a compressive strain. After termination of the method of the invention, these inherent compressive stresses remain in the core layer and thus also in the sandwich component. In this way the inherent compressive stress forms, as it were, an inherent stress reserve against the detrimental tensile stresses in the material of the core layer. In particular with a view to the operational situation of a sandwich component on an aircraft, e.g. at −50° C., the neutral position of the inherent stress in the material of the core layer is in this way lowered to negative temperature ranges, in particular to the cooling temperature for the generation of the compressive strain. This is also referred to as a so-called stress-free-shift.

Here the cooling temperature is advantageously clearly below the ambient temperature, in particular below 0° C. By way of example, cooling down to −50° C. is possible. The technically meaningful range with regard to the required cooling energy for the cooling temperature is between −20 and −10° C. Other than the inherent tensile stresses which act to favor or form cracks in the core layer, inherent compressive stresses in the material of the core layer have a crack-inhibiting or crack-stopping effect.

Another subject matter of the present invention is a manufacturing device for manufacturing a sandwich component. Such a manufacturing device comprises a tool device which comprises a reception device and an upper covering device adapted to be placed on the latter. These two are configured such that between them a tool cavity for play-free reception of a semifinished product arrangement intended for the manufacture of the sandwich component, flowing aids, and an arrangement of sheets surrounding the latter is provided. Furthermore a stiffening device for stiffening the tool device is provided, which comprises support devices arranged on opposed sides of the tool device, a stiffening carrier extending between these and mounted on the support devices, and at least one force transmission device connecting the stiffening carrier to the upper covering device for stiffening the latter in the longitudinal direction thereof. Here it is possible that the reception device of the tool device is movable on rails or wheels, for example guided by rods, and a latching mechanism is provided which fixes the position of the reception device, i.e. is locked when the latter is in the correct position for placing the upper covering device. Placing the upper covering device is only made possible, or triggered, by locking of the latching device. Furthermore the upper covering device may also be movable directly or indirectly via the stiffening carrier in rails which are provided in the support devices. Along these rails, the stiffening carrier jointly with the upper covering device or the upper covering device by itself may thus be displaced or moved and placed on the reception device. Subsequently it is possible that the reception device with the upper covering device is secured in the placed position by bolts.

In the manufacturing device of the invention there are furthermore a temperature sensor device for detecting the temperature of at least on of the reception devices, a matrix material feeding device for introducing matrix material into the tool cavity, and a negative pressure device for subjecting the tool cavity to negative pressure. It is thus possible with a manufacturing device of the invention to carry out a constant-volume method of the invention with its advantages described in detail.

Between these support devices there extends the at least one stiffening carrier that is mounted on the support devices and comprises at least the one force transmission device which connects the stiffening carrier to the upper covering devices so as to stiffen these in the longitudinal direction thereof. In other words, in this way the force applied during heating of the semifinished product arrangement in the tool cavity between the reception device and the upper covering device as a result of the expansion of the core layer may be eliminated or received, respectively. An expanding core layer which is limited in its expansion volume builds up an inherent compressive stress on its inside. This inherent compressive stress supports itself against the lower reception device and in particular against the upper covering device. In order to hold the upper covering device in place in the sense of its volume-limiting property, this force must be supported further. This is achieved via force transmission devices as provided, e.g., in full surface, partial surface, or in the form of single connection elements, in order to transmit the force to the stiffening carrier. This stiffening carrier is in turn mounted in the support devices, so that the opposing force for the volume limitation may lastly be intercepted via the latter. In other words, the stiffening device serves the function of providing the necessary volume limitation force for the volume limitation device, in particular for the upper covering device, in a manufacturing device of the invention.

The stiffening device may be improved in the sense that the upper covering device and/or the stiffening carrier, in addition to their rigid structure additionally comprise stiffening ribs. These are in particular arranged in such a way as to achieve a further stiffening of the stiffening carrier and/or of the upper covering device for receiving the forces expected as a result of the temperature increase from the semifinished product arrangement accommodated in the tool cavity. Such stiffening ribs serve the purpose of stiffening at a least possible expenditure of material.

In a manufacturing device of the invention a temperature sensor device for detecting the temperature of at least one of the reception devices is furthermore provided. Such a temperature sensor device has the purpose of determining, independently of the shape of the semifinished product arrangement, the temperature of the reception device and/or the upper covering device and thereby provide an indication for the corresponding temperature of the semifinished product arrangement. The temperature sensor device thus serves to provide its determined data to a process control so as to be able to carry out the method steps of the invention of the individual heating phases, holding phases, infusion phases or curing phases in accordance with the invention.

Furthermore a matrix material feeding device for introducing matrix material into the cavity is provided. Via this matrix material feeding device it is possible to supply matrix material from a vat or a material reception pot or material stock reception in the form of a matrix material storage container having, e.g., resin stored therein, in a desired manner. The matrix material feeding device comprises at least one connection or port to the tool cavity, so that the matrix material may be introduced into the tool cavity. The introduction particularly takes place indirectly by applying a negative pressure via an equally provided negative pressure device for subjecting the tool cavity to negative pressure. Due to the application of negative pressure to the tool cavity and an opened matrix material feeding device, matrix material flows into the tool cavity until the latter is completely soaked, i.e., evacuated substantially completely. Subsequently the further heating process of the second heating phase in accordance with the method of the invention may be carried out, whereby the curing process begins. The matrix material storage container is advantageously arranged above the tool device. It may be provided, e.g., at an upper and of one of the support devices. The raised arrangement of the matrix stock supports the supply of matrix material, for in this way the hydrostatic pressure for the introduction of the flowable matrix material rises.

A manufacturing device of the invention serves in particular for carrying out a method of the invention. Accordingly, it includes the same advantages as was explained in detail for the constant-volume method of the invention. In particular, a manufacturing device of the invention allows to manufacture a sandwich component which comprises a sandwich structure and nevertheless has very low or hardly any inherent stresses, in particular no inherent tensile stresses in the material, especially the core layer. This is ensured by the provision of a closed tool, i.e. in the form of the reception device and the upper covering device as a result of the volume limitation thereby made possible.

In a manufacturing device of the invention it may be advantageous if the reception device and the upper covering device are formed of a material having very low thermal expansion coefficients. This is in particular sensible in that in a volume limitation device having two reception devices, the inner space, i.e. the dimensions of the tool cavity, remains substantially constant as a result of low thermal expansion coefficients. Otherwise there would be a risk of the tool cavity becoming smaller or larger due to an expansion of the reception device and/or the upper covering device, with an internal pressure increase on the semifinished product arrangement, or a non-constant volume of the tool cavity accordingly becoming possible. For example, the reception device may be made of the material Invar which is particularly low-priced and exhibits low expansion due to temperature. The upper covering device may, e.g., be formed of a more expensive material such as a CFRP composite material which, although more expensive, is preferable with a view to the necessary handling tasks of the upper covering device due to its light weight. An upper covering device of CFRP moreover is clearly stiffer against internal pressure than would be the case with other comparable materials such as Invar. Alternatively, the upper covering device may be made of CFRP and coated with Invar in order to raise the service life of the upper covering device to the level of the reception device. In other words, it is possible in this way to provide a tool device which limits the volume in a sufficient manner, i.e. in particular generates the equilibrium of forces necessary for this purpose.

As was already mentioned, the matrix material stock for the generation of hydrostatic pressure supporting the introduction process of the matrix material may be arranged above the tool cavity. In this way it is possible to assist the introduction, e.g. in the event of fluctuating negative pressure capacity, into the tool cavity.

A manufacturing device of the invention may be developed further in the sense that the manufacturing device comprises a heating device and a temperature regulation device functionally connected to the temperature sensor device and the heating device. The temperature regulation device is configured such as to control the temperature of at least the reception device or the upper covering device by the heating device. The temperature control is carried out in dependence on the temperature measured by the respective temperature sensor device. There accordingly exists a control circuit which compares a target temperature for the reception device and/or the upper covering device with the measured actual temperature and furthermore controls the control of the heating device in dependence on the difference between target and actual temperature with a view to supplementary heating or stopping the heating operation.

It may furthermore be advantageous if in a manufacturing device of the invention the heating device is formed of an oven having a heater fan. In particular, fan openings are provided which may be opened and closed by the temperature regulation device for controlling the temperature of at least one of the reception devices. The fan openings also serve the function of influencing the heat input in such an oven, and thus the heat input to the lower reception device and/or the upper covering device, independently of a control of the heater fan. In particular it is possible to operate the oven, and thus heater fan, in a substantially constant manner and to perform the desired temperature regulation in a particularly simple and above all rapid manner by opening and closing the fan openings.

BRIEF DESCRIPTION OF THE DRAWINGS

The invention is explained in more detail by referring to the enclosed figures of the drawings. In this description, the used expressions "left", "right", "top" and "bottom" refer to an orientation of the figures of the drawings with reference numerals legible in a normal way.

FIG. 6 shows a further embodiment of a temperature profile and a pressure development;
FIG. 11 is a cross-sectional view of a tool device comprising an overpressure device.

DETAILED DESCRIPTION

Figure 1:
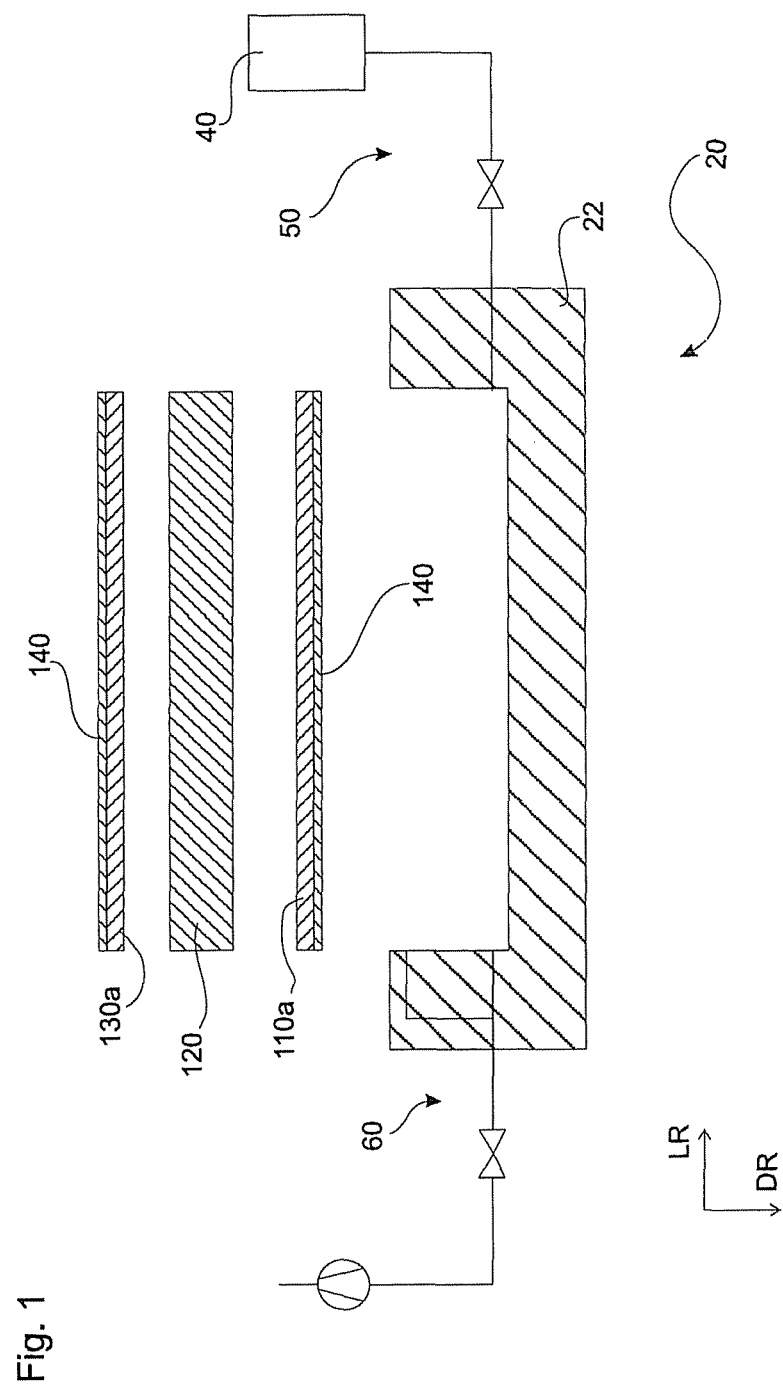
FIG. 1 shows a first step of a method of the invention.
Figure 2:
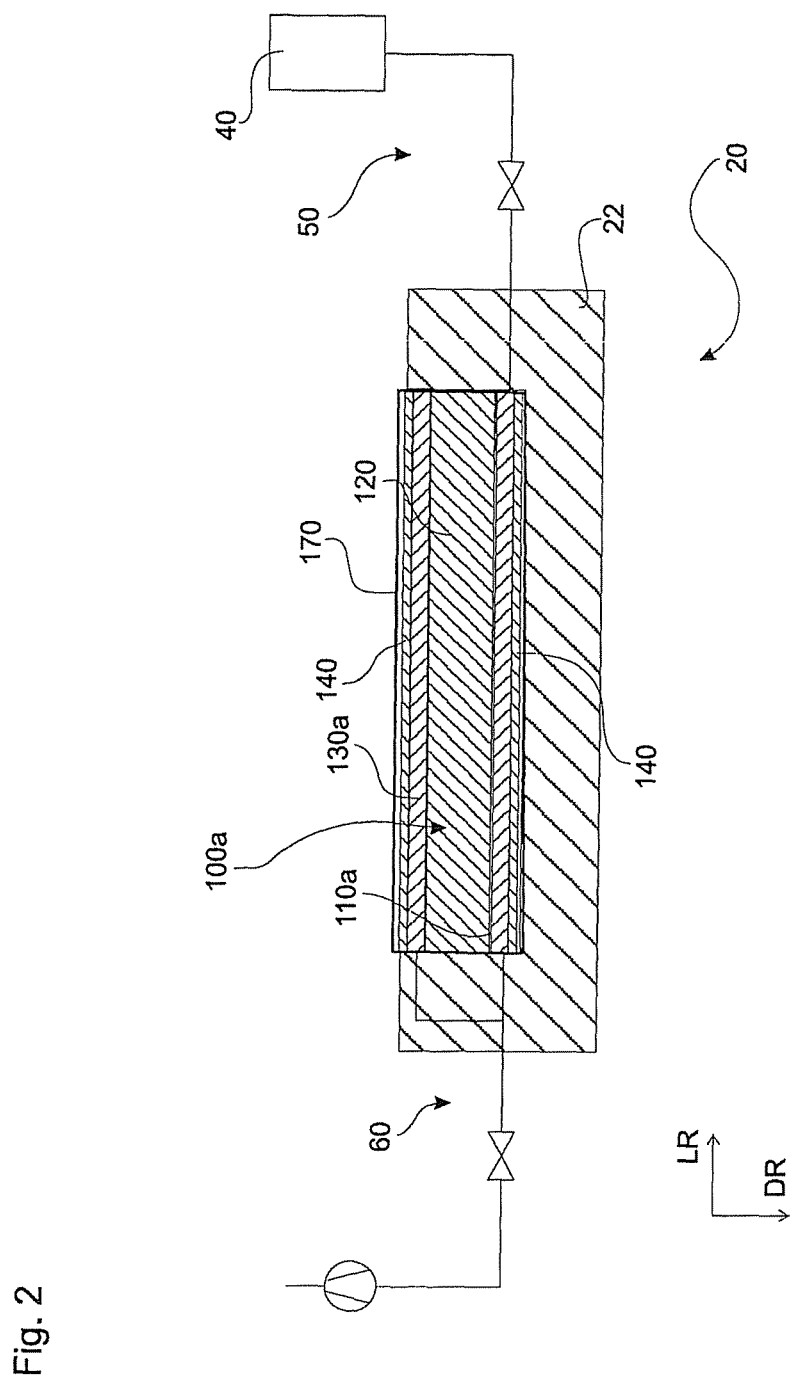
FIG. 2 shows a further step of a method of the invention.

FIG. 1 is a cross-sectional view of a tool device 20 comprising a reception device 22. Above it, furthermore shown in a drawn-apart representation, a dry semifinished product tissue 110a for the formation of a first skin layer 110, a core layer 120, as well as a dry semifinished product tissue 130a for the formation of second skin layer 130 are visible. In the present practical example, the core layer 120 consists of a closed-cell rigid foam, i.e. a rigid foam having closed pores. On two dry semifinished product tissues 110a and 130a a respective flowing aid 140 is provided. These layers are guided downwards and inserted in the reception device 22, as is shown in FIG. 2. Before or during this insertion an arrangement of sheets 170 is placed around the flowing aids 140, the dry semifinished product tissues 110a and 130a, as well as the core layer 120. The final state of this enveloping with the aid of the arrangement of sheets 170 is represented in FIG. 2. The arrangement of sheets 170 is a semipermeable arrangement of sheets. The semi-permeable arrangement of sheets is gas-permeable but impermeable to matrix material.

As may also be seen from FIG. 1 and from the further figures, a two-dimensional coordinate system is established by the extension of the core layer 120. It has a thickness direction DR and a longitudinal direction LR. This coordinate system is stationary relative to the sandwich component 100 or to the dry semifinished product arrangement 100a, respectively.

The two dry semifinished product tissues 110a and 130a are a fabric of fibers, or a tissue of fibers. These fibers may, e.g., be carbon fibers, so that the dry semifinished product tissues 110a and 130a may be CFRP fabrics or CFRP tissues. On the two left sides of the reception device 22, respective connections for performing the method are provided. Thus, on the right side of the reception device 22 there is a matrix material feeding device 50 capable of introducing flowable matrix material into the cavity of the reception device 22 via a valve from a matrix material storage container 40. This infusion process is driven or carried out by the negative pressure device 60 on the left side of the reception device 22. Via a connection and a valve a compressor is provided which can carry out an evacuation from the cavity of the reception device 22.

Following inserting in the manner of the invention, in particular enveloping with the arrangement of sheets 170, a situation as represented in FIG. 2 has been reached. Here it is well visible that a thickness direction DR and a longitudinal direction LR may be defined by the arrangement of the single layers, in particular the core layer 120. The thickness direction DR of this coordinate system is substantially in the receiving direction, i.e. in the direction of insertion of the single layers, in particular the core layer 120. Perpendicular to this is the longitudinal direction LR which may also be formed by two longitudinal directions in a three-dimensional coordinate system which are perpendicular to each other.

It may moreover be seen from FIG. 2 that the two connections of the matrix material feeding device 50 and of the negative pressure device 60 are positioned in a functional manner. This means that the connection of the negative pressure device 60 opens to the outer side of the arrangement of sheets 170, and the connection of the matrix material feeding device 50 opens to the inner side of the arrangement of sheets 170. In other words, the connection of the matrix material feeding device 50 represents a sprue device for the introduction of the flowable matrix material 150 into the semifinished product arrangement 100a, and the connection of the negative pressure device 60 represents an evacuation device for evacuating gas through the semipermeable arrangement of sheets 170 in order to generate a negative pressure inside the arrangement of sheets 170. In order to obtain this negative pressure, an additional sheet may in particular situations of use seal the environment from the connection of the negative pressure device 60 which is correspondingly gas-tight. This gas tightness may, however, also be generated by an upper covering device 24a as is placed, e.g., on the lower reception device 22 in FIG. 3. Following completion of the insertion of the semifinished product arrangement 100a for creating a sandwich structure for the sandwich component 100, the flowing aids 140 and the arrangement of sheets 170, the volume limitation device 24 is inserted or placed in position, respectively. In the embodiment of the present FIG. 3, the volume limitation device 24 is an upper covering device 24a. This is placed on the reception device 22. In the process a tool cavity 26 is formed between the reception device 22 and the upper covering device 24a which is adapted with regard to its dimensions, in particular in the direction of thickness DR of the core layer 120, to the inserted layers, i.e. the two dry semifinished product tissues 110a and 130a, the core layer 120, the flowing aids 140, as well as the arrangement of sheets 170 so as to result in a reception of the contained layers in the tool cavity 26 a substantially without play.

To this end, the tool cavity 26 has a thickness d3 in the direction of thickness DR. The dry semifinished product tissues 110a and 130a as well as the core layer 120 jointly make up the thickness of the semifinished product 100a which is designated by d1 in FIG. 3. It is furthermore possible to add the thicknesses of the flowing aids 140 and of the arrangement of sheets 170 to this thickness d1, to result in the thickness d2.

These three dimensions are correlated with each other as follows, in the sense of a reception in the tool cavity 26 substantially without play. The flowing aid 140 may be partly compressible. Accordingly it is advantageous if the thickness d3, i.e. the dimension in the direction of thickness DR of the tool cavity 26, presents a maximum value that is not greater but smaller or equal to the value d2. Hereby it is ensured that no air space remains outside the arrangement of sheets 170, so that there is no space for an expansion particularly of the core layer 120.

Furthermore, the distance of the reception device 22 and the upper covering device 24a designated by d3 must be selected greater than the thickness of the semifinished products 100, namely, the thickness d1. Accordingly, d1 forms the lower limit for the thickness of the cavity 26, i.e. the thickness d3. d1 is defined as the lower limit, for in such an embodiment for the thickness d3 the flowing aid 140 would have to be compressed nearly completely in order to interconnect the reception devices 22 and the upper covering device 24a. As a complete compression is not possible, a compression in a slight degree of the core layer 120 and the two semifinished product tissues 110a and 130a will also be carried out. It is, however, the aim in such a fundamental compression of the elements received in the tool cavity 26 to limit the pressure generation within the tool cavity 26 to a maximum of 0.3 bar. The above definition is intended to give the expression "gap-free" within the meaning of the present application.

Figure 3:
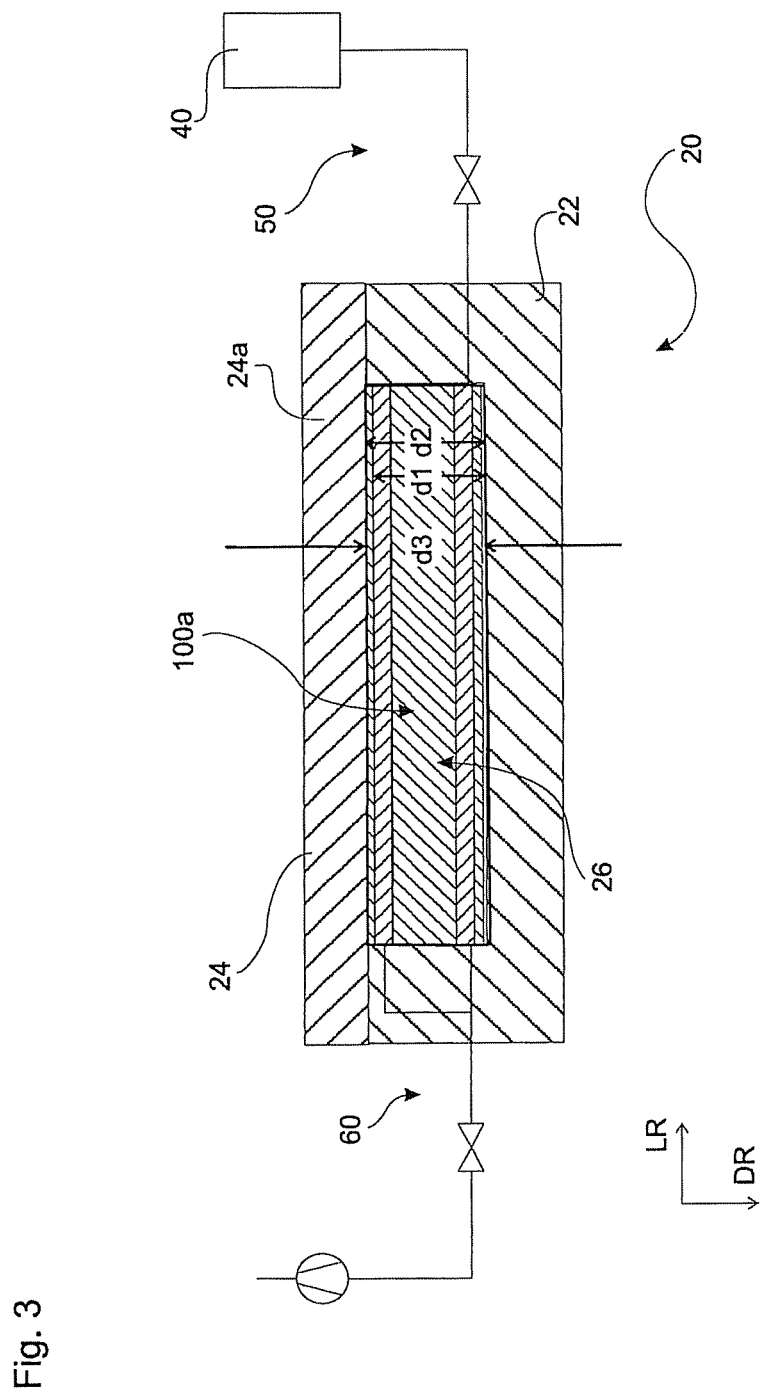
FIG. 3 shows a further step of a method of the invention.

In the position represented in FIG. 3, the method of the invention is carried out further. In particular two heating phases, T1, T2, an intermediate infusion phase Inf, a subsequent curing phase AUs, and a final cooling phase Kue are carried out. A more detailed description in this regard will be provided later on.

Figure 4:
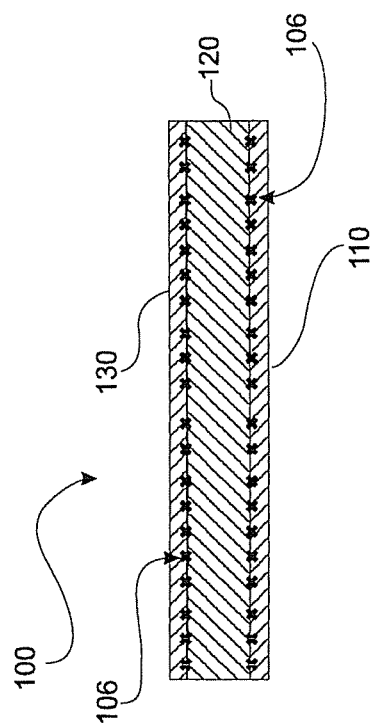
FIG. 4 shows a sandwich structure panel manufactured in accordance with the invention.

In the position represented in FIG. 3, the matrix material 150 was is infused and cured. The matrix material used has a working temperature clearly above the ambient temperature, e.g. in a range from 80° C. to 120° C. Accordingly this is a matrix material which is to be worked in the hot condition, as compared to matrix materials that may be worked cold, at temperatures in the range of the ambient temperature, i.e. that may be infused. The utilization of such matrix materials allows the manufacture of particularly high-quality sandwich components for the aircraft industry that may be employed in a particularly wide v of temperatures. Curing resulted in the formation of the connection areas 106, just like the two skin layers 110 and 130 from the two dry semifinished product tissues 110a and 130a, as may be seen, e.g., from FIG. 4. Via these connection areas 106 the core layer 120 is fixedly connected to the skin layers 110 and 130. The finished sandwich component 100 of FIG. 4 may now be used directly in this way, or may be subjected to a final tempering step Tem for complete curing of the introduced matrix material 150. In the cured situation of FIG. 3, the matrix material 150 is not exactly definable any more but is present in the cured state in the semifinished product tissues 110a and 130a while forming the two skin layers 110 and 130, and penetrated in areas in the core layer 120 to form the connection areas 106.

In the following the temperature developments, the single phases and the corresponding effects on the individual elements of the semifinished product arrangement 100a shall be explained briefly.

Figure 5A:
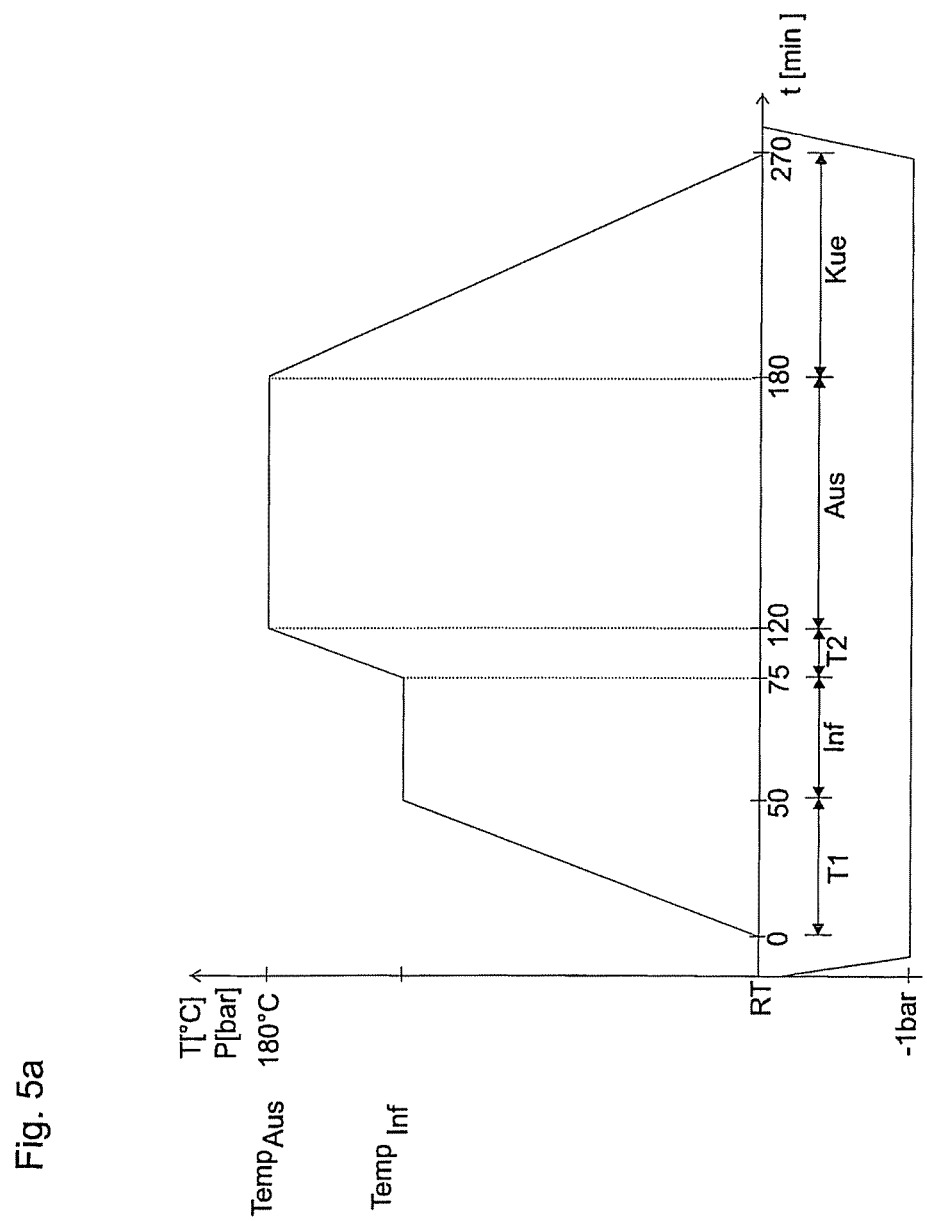
FIG. 5a shows an embodiment of a temperature profile and a pressure development.

In FIG. 5a a possible temperature and pressure development for a method of the invention is represented. In the following, the single phases of a method of the invention shall be described by way of this development. Following insertion of the individual elements, i.e. the dry semifinished product tissues 110a and 130a and the core layer 120, the flowing aids 140 and enveloping by the arrangement of sheets 170, after closing the reception device 22 by the upper covering device 24a a negative pressure is applied in the tool cavity 26. This negative pressure builds up and is adjusted, by referring to standard conditions, to approx. Minus 1 bar. This is, of course, not an absolute zero point of the pressure but a technically obtainable negative pressure. After the negative pressure has been applied and the single layers, in particular the dry semifinished product tissues 110a and 130a are in this manner kept in the inserted position or immobilized, a first heating process, i.e. the first heating phase T1 may be carried out.

The first heating phase T1 serves for preparing the inserted semifinished product arrangement 100a for the subsequent infusion phase Inf. Preheating lasts approx. 50 minutes and takes place from ambient temperature to up to 120° Celsius. A temperature range in which the infusion temperature $Temp_{inf}$ should be situated may be specified as 80 to 120° C. As soon as the semifinished product arrangement 100a has reached the infusion temperature $Temp_{inf}$, e.g. 120° Celsius, the inlet for matrix material 150 is enabled, so that the latter is sucked by the negative pressure or vacuum and infused into the tool cavity 26 and thus into the semifinished product arrangement 100a. The infusion phase Inf for matrix material 150 usually lasts between 20 and 30, in particular 25 minutes. The duration mainly depends on the viscosity, i.e. the property of the matrix material. The more viscous a material is, i.e. the higher the viscosity, the longer the duration of the infusion phase Inf will be. The interaction between infusion temperature $Temp_{inf}$, matrix material 150 and infusion phase duration should basically be selected such that the infusion phase duration is substantially shorter than the so-called potlife, i.e. the maximum processing period of the matrix material 150 with regard to its curing.

Following the completion of the infusion phase Inf, i.e. following substantially complete filling of all desired areas inside the semifinished product arrangement 100a with matrix material 150, the second heating phase T2 may begin. The last part of the infusion phase Inf may, of course, still take place in the second heating phase T2 which has already begun. The latter takes approx. 45 minutes and heats the semifinished product arrangement 100a, now soaked with matrix material 150, to a higher temperature for curing, i.e. the curing temperature $Temp_{Aus}$. This is in particular situated in the range from 160 to 220° C., for instance at 180° Celsius. At this time, i.e. immediately following the second heating phase T2, at least the major part of the matrix material 150 is still liquid or flowable and not cured yet. The curing phase Aus proper is carried out at the higher temperature of 180° Celsius, and this temperature is held, e.g., for more than 60 minutes.

Curing takes place, e.g., by polymerization of the matrix material 150 and accompanying crosslinking and generation of the desired connection areas 106. Following termination of the curing phase Aus, the sandwich component 100 having formed is again cooled to ambient temperature RT during a cooling phase Kue. At this time at the latest the negative pressure is eliminated, so that an aeration of the tool cavity 26 takes place, as it were, to then be able to remove the finished sandwich component 100 from the tool.

Reference to the temperature profiles accordingly allows to subdivide a method of the invention, i.e. both a constant-volume method of the invention and a quasi-stationary temperature method of the invention, into the following phases. In the first heating phase T1, heating to the infusion temperature $Temp_{inf}$ is carried out. At the infusion temperature $Temp_{inf}$, the infusion phase Inf is made use of at a constant temperature for the infusion with matrix material 150. Subsequently in the second heating phase T2, heating to a curing temperature $Temp_{Aus}$ situated above the infusion temperature $Temp_{inf}$ is carried out. At the curing temperature $Temp_{Aus}$, dwelling is performed until the desired curing of the matrix material 150, or the desired degree of curing, has been reached. Subsequently, cooling to ambient temperature RT is performed in a cooling phase Kue. If vacuum, i.e. negative pressure is used, the latter may already be turned off earlier. For example, the negative pressure generation may already be turned off during the curing phase Aus, e.g. from half the curing phase Aus. At this time sufficient curing, e.g. sufficient crosslinking has already taken place, so that a further generation of negative pressure is not necessary any more. What is crucial, however, in the use of generation of negative pressure, that a vacuum must be applied, i.e. a negative pressure must be generated in the tool cavity 26 during the first heating phase T1, during the infusion phase T1, and also during the second heating phase T2.

In dependence on the temperature profile of FIG. 5a, a corresponding mechanical stress is also generated inside the core layer 120. This depends on the temperature and increases with a higher temperature of the semifinished product arrangement 100a. The mechanical stress exists because due to the lower reception device 22 and the upper covering device 24a the volume for an expansion of the core layer 120 does not exist, i.e. the volume of the core layer 120 is limited to its starting volume. In this way the inherent compressive stress inside the material of the core layer 120 also rises conjointly with the temperature. This is, however, not significant inasmuch complete cooling to the starting temperature, in particular to ambient temperature RT again takes place after performance of the process. In this way the inherent compressive stress is again eliminated by the cooling in the same degree as the inherent stress previously built up with the rise in temperature. As a result, a sandwich component 100 is produced which is substantially free of inherent tensile stress.

Figure 5B:
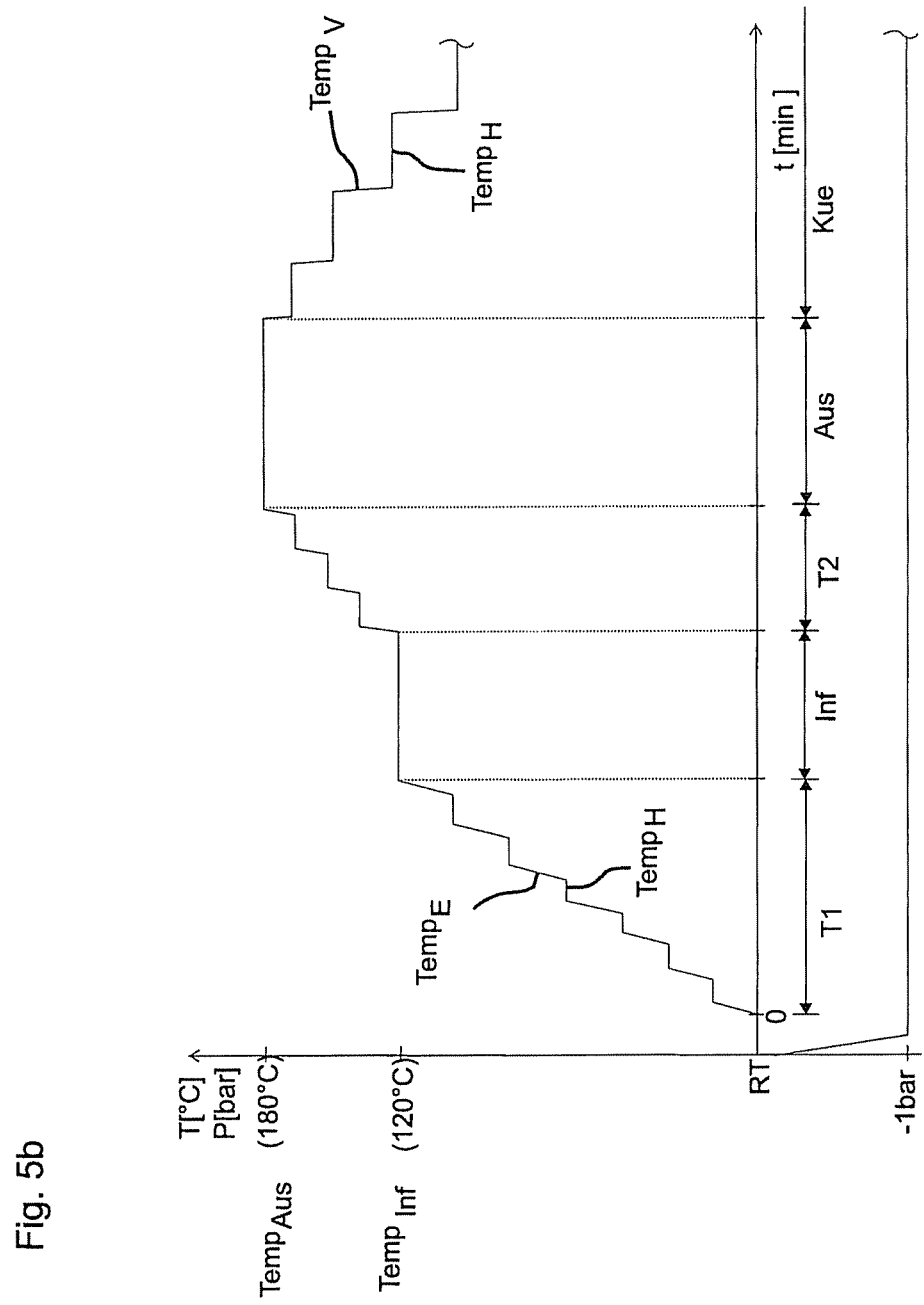
FIG. 5b shows a further embodiment of a temperature profile and a pressure development.

FIG. 5b shows a possible modification of the temperature profile of FIG. 5a. Here the single temperature change phases, i.e. the two heating phases T1, T2 and the cooling phase Kue, are each performed stepwise. The single stepwise realizations may be combined freely among each other. Thus it is possible, e.g., that only the second heating phase T2 is performed stepwise, that the first and the second heating phase T1, T2 are performed stepwise, or only the second heating phase T2 and the cooling phase Kue are performed stepwise. Even a stepwise realization of all of the temperature change phases as represented in FIG. 5b is conceivable. The stepwise temperature increase of the semifinished product arrangement 100a takes place in partial steps to a curing temperature $Tem_{Aus}$. Each partial step includes, e.g., a temperature raising portion $Temp_E$ and a temperature holding portion $Temp_H$ in order to achieve a temperature equalization within the semifinished product arrangement 100a. For example, the temperature change rate during the temperature raising step $Temp_E$ may be in the range from 1° C./min to 4° C./min, wherein the temperature is raised by 1° C. to 10° C. during the temperature raising step $Temp_E$. The temperature holding step $Temp_H$, on the other hand, may be 2 to 10 times as long as the temperature raising step $Temp_H$. During the temperature holding step $Temp_H$, the temperature may remain substantially constant or increase or decrease slightly, e.g. at a temperature change rate of less than 1° C./min. The stepwise performance of the respective temperature changes is important particularly with a view to a homogeneous temperature distribution inside the semifinished product arrangement 100a or inside the sandwich component 100. Thus it is possible by equalizing the temperature to limit different temperature jumps or temperature gradients, i.e. different volumes in the core layer 120 presenting different temperatures, to a maximum temperature difference, so that crushing in the foam may be prevented. The same is also true for the material relaxation during the cooling phase which is made possible in this way. A temperature reduction of the semifinished product arrangement 100a in the cooling phase Kue takes place stepwise in partial steps. Thus, e.g., each partial step is composed of a temperature reducing portion $Temp_V$ and a temperature holding portion $Temp_H$ in order to optimize a material relaxation within the semifinished product arrangement 100a. For example, the temperature change rate during the temperature reducing portion $Temp_V$ may be in a range from 1° C./min to 4° C./min. During the temperature reducing portion $Temp_V$, the temperature is reduced by 1° C. to 10° C. The temperature holding step $Temp_H$, on the other hand, may be 2 to 10 times as long as the temperature reducing portion $Temp_E$. During the temperature holding step $Temp_H$, the temperature may remain substantially constant or increase or decrease slightly, e.g. at a temperature change rate of less than 1° C./min. The temperature profile as represented in FIG. 5b is possible in particular for any wet processes, i.e. any kinds of LCM (Liquid Composite Molding). The advantages of the reduction of the inherent tensile stress by using the temperature steps of the invention are not restricted to the combination with the limitation of the volume of the tool cavity 26.

FIG. 6 shows an accelerated realization of a method as represented in FIG. 5a with regard to the temperature and pressure developments. The identical acceleration may also be performed for the temperature profile variants described with reference to FIG. 5b. An acceleration could here be carried out in particular with a view to the duration of the curing phase Aus. The shortening of the curing phase Aus had the result that the matrix material 150 does not cure completely during the curing phase Aus but only to a predefined degree of curing, for example 70 to 90%. Further curing is not necessary at this time, for subsequently a so-called tempering phase Tem is carried out. This tempering phase Tem is carried out at a temperature above the curing temperature $Temp_{Aus}$, e.g. 180 to 220° Celsius, and has to be carried out in particular outside the tool device 20. The tool device 20 thus is free again for the subsequent performance of the method of the invention, while the tempering phase Tem may be carried out in parallel, i.e. simultaneously for several sandwich components 100. This reduces the process duration and thus increases the throughput number or number of pieces in the performance of a method of the invention, both a constant-volume method of the invention and a quasi-stationary temperature method of the invention.

Figure 7A:
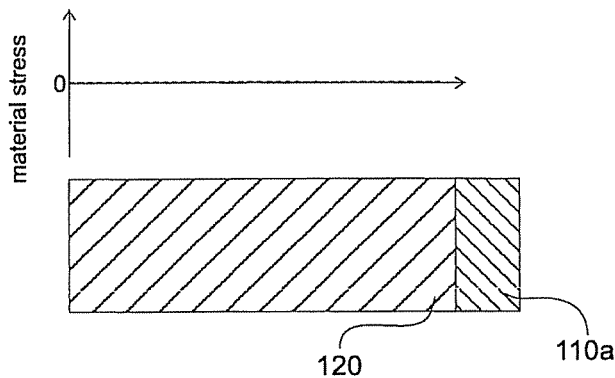
FIG. 7a shows a prior-art semifinished product at ambient temperature.
Figure 7B:
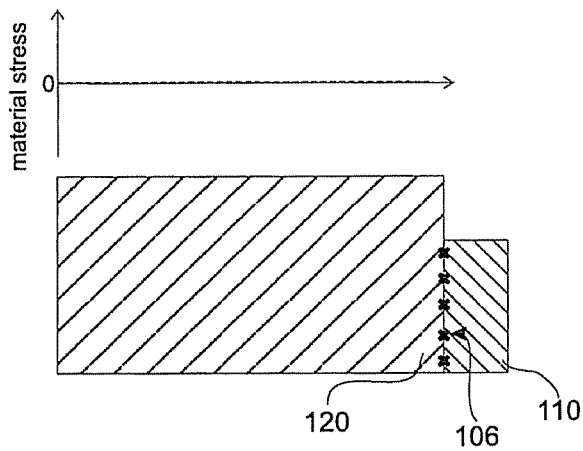
FIG. 7b shows a prior-art semifinished product at curing temperature.
Figure 7C:
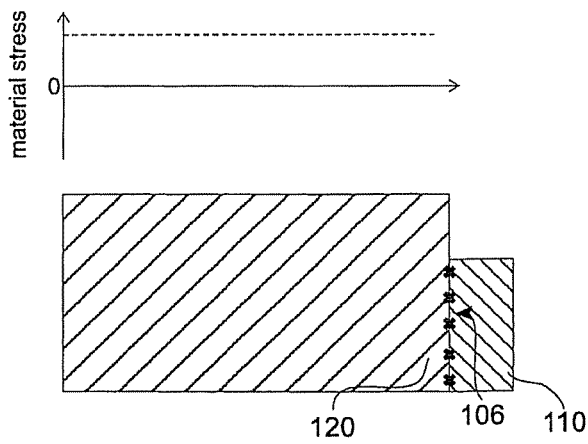
FIG. 7c shows a sandwich structure part following manufacture in accordance with the prior art.

Referring to FIGS. 7a to 7c as well as 8a and 8c, one of the advantages of a method of the invention, in particular of the constant-volume method of the invention, is once again explained in detail.

FIGS. 7a to 7c show the volume expansions and the corresponding results in the use of known prior-art methods. In each figure the inherent stress present in this state is represented qualitatively.

In FIG. 7a the state at ambient temperature RT is represented schematically. The core layer 120 and an applied dry semifinished product tissue 110a substantially present a same volume expansion. The material stress in the core layer 120 here is substantially zero. In FIG. 7b a situation during the curing phase Aus is represented. The latter is carried out at approx. 180° Celsius, so that the individual elements, i.e. in particular the core layer 120 and the first skin layer 110 meanwhile formed have expanded in accordance with their thermal expansion coefficients. Due to the fact that the core layer 120 has a substantially greater thermal expansion coefficient than the skin layer 110, its expansion, i.e. its volume load, is clearly higher. As the expansion of the volume of the core layer 120 does not meet any opposition, the material stress in this situation remains substantially zero, and the core layer 120 expands in accordance with the prevailing temperature. At the same time the connection area 106 is formed in this expanded position, i.e. the core layer 120 is connected to the skin layer 110. Subsequently cooling is performed so that the cooling elements would actually contract in accordance with their thermal expansion coefficients. Due to the low thermal expansion coefficients of the skin layers 110 (and 130), these would hardly contract, whereas the core layer 120 would deform back into its substantially original volumen shape as represented in FIG. 7a. It is inhibited in this deformation, however, i.e. in the contraction by the connection area 106 which has meanwhile been formed and partly cured or completely cured. In the intermediate state represented in FIG. 7b, the connection 106 represented therein is not fully effective yet as a connection because the resin has not cured yet at this time. The core layer 120 may thus not contract as desired, so that an inherent stress is created as tensile stress during cooling. This tensile stress is represented as a material inherent stress in the graph of FIG. 7c.

Figure 8A:
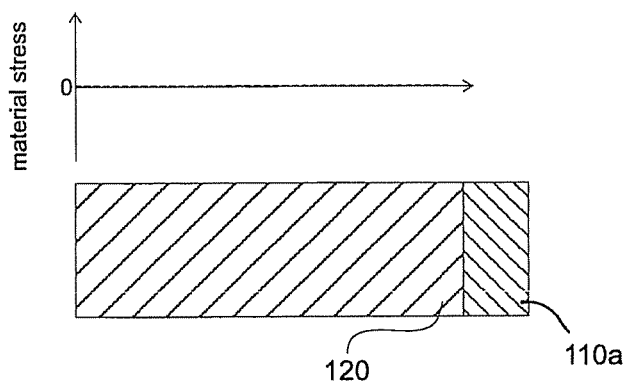
FIG. 8a shows a semifinished product according to the present invention at ambient temperature.
Figure 8B:
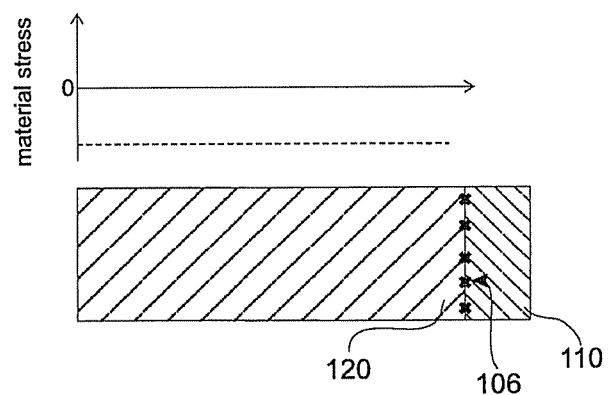
FIG. 8b shows a semifinished product according to the present invention at curing temperature.
Figure 8C:
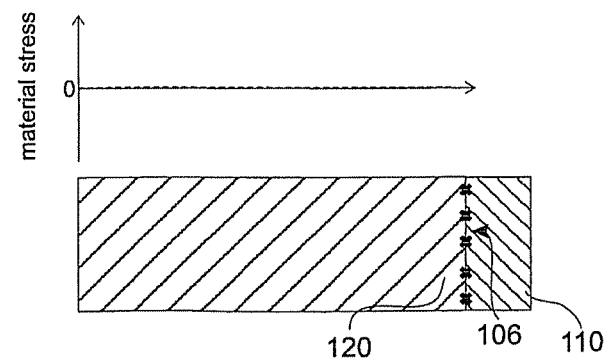
FIG. 8c shows a sandwich structure panel after the cooling process.

In contrast, an inherent tensile stress in the finished component, i.e. in the finished sandwich structure part 100, may substantially be avoided with a method of the invention. The starting point of FIG. 8a is identical with the starting point of FIG. 7a. But upon further heating, in particular the first heating phase T1 and the second heating phase T2, the infusion process Inf and the curing phase Aus, a volume limitation device 24 is used in order to limit the volume of the core layer 120 and of the entire semifinished product arrangement 100a. The core layer 120 thus is not free to follow the temperature profile and expand accordingly. The volume of the core layer 120 rather remains substantially constant, as may be seen in FIG. 8b, e.g., with regard to the curing phase Aus. Instead, an inherent compressive stress builds up inside the core layer 120, which is held in the equilibrium of forces through the corresponding volume limitation device 24. In thus unexpanded state of the core layer 120, the connection area 106 is formed, i.e. a connection between the core layer 120 and the formed skin layer 110 is produced. When the semifinished product arrangement 100a is cooled again, the core layer 120 will not contract because due to the influence of the volume limitation device it is already in an expansion state corresponding to the ambient temperature RT. During cooling of the semifinished product arrangement, the inherent compressive stresses generated in it during heating are being eliminated. As a result, there is a sandwich component 100 which substantially does not present any material inherent tensile stresses.

Figure 9:
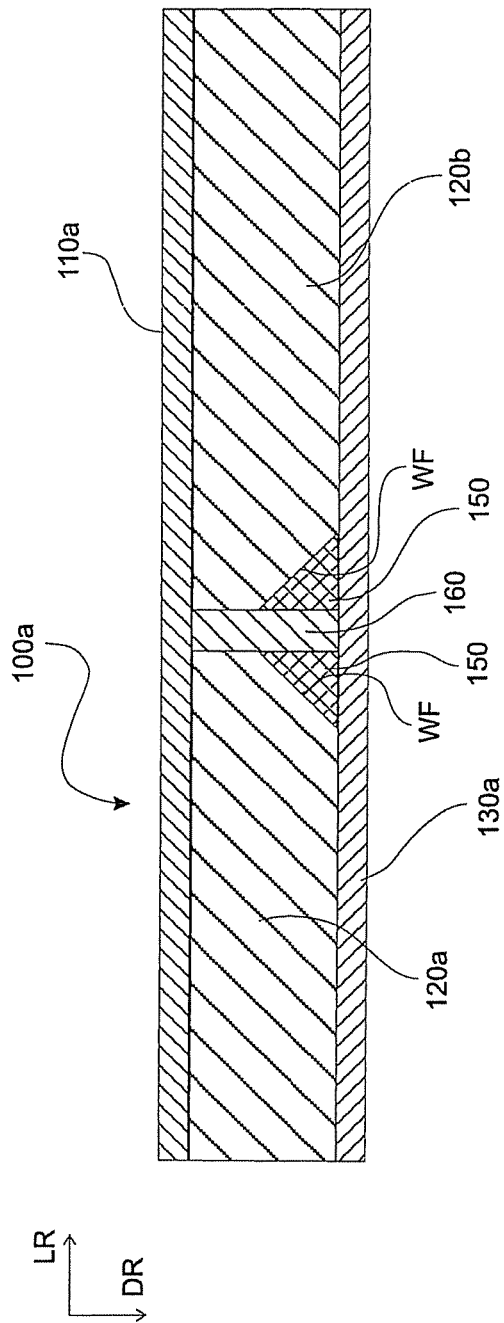
FIG. 9 is a cross-sectional view of a semifinished product during the infusion process.

In FIG. 9 a situation during the second heating phase T2 is represented in cross-section. Here it may be seen that a reinforcement device 160 disposed between two foam panels 120a and 120b is provided between the two skin layers 110 and 130. Due to this reinforcement device 160, the introduction of heat during the second heating phase T2 is inhomogeneous across the semifinished product arrangement 100a. The heat is thus distributed relatively homogeneously in the skin layers 110 and 130, however introduced by the reinforcement device 160 more rapidly into these adjacent areas of the foam panel 120a and 120b of the core layer 120 than is the case in the remaining areas of the core layer 120. This results in heat fronts WF which pass inhomogeneously through the core layer 120, i.e. through the foam panels 120a and 120b. These heat fronts WF result in the risk of single, adjacently situated volume elements of the core layer 120 presenting clearly different temperatures, i.e. high temperature gradients. Such clearly different temperatures may bring about highly different deformations, or highly different stresses of adjacent volume elements in the core layer 120. This may result in crushing of the material of the core layer 120, or crushing or shifting of the reinforcement devices 160. In order to avoid this, and in particular to thus provide the heat fronts WF with less considerable temperature gradients, it may be advantageous—as represented in FIG. 5b—in particular to carry out the second heating phase stepwise. Such stepwise heating is conceivable, e.g., through two minutes and five degrees, wherein a holding interval of approx. fifteen minutes is observed between the single steps. In this way the temperature gradient is reduced, and thus the differences in the inherent stresses in the adjacently situated volume elements of the core layer 120 are reduced to a minimum.

FIG. 9 furthermore shows an embodiment of the semifinished product arrangement 100a wherein the core layer 120 is formed by two or several adjacently arranged foam panels 120a and 120b. Between the abutting faces of these foam panels 120a and 120b the corresponding reinforcement device 160 is provided which may, e.g., be formed as a kind of pin, in particular of a CFRP material. Such reinforcement devices 160 may, of course, i.e. be arranged directly in the marginal areas of the respective foam panel 120a and 120b and not only in the area therebetween.

Figure 10:
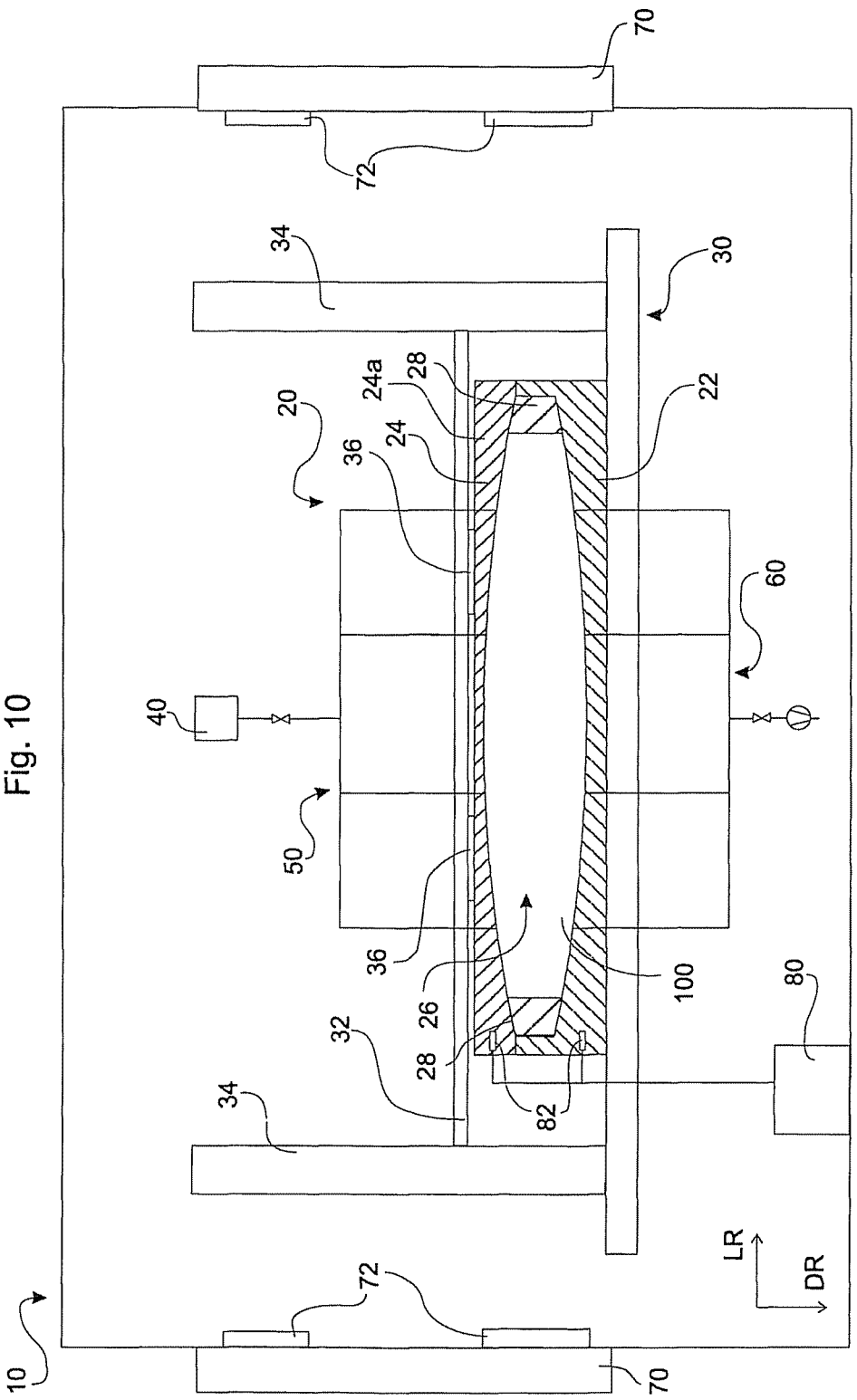
FIG. 10 shows a first embodiment of a manufacturing device of the invention.

FIG. 10 schematically shows an embodiment of a manufacturing device 10 of the invention. It comprises as one of its central elements a tool device 20 which comprises a lower reception device 22 and a volume limitation device 24 configured as an upper covering device 24a. The lower reception device 22 and the upper covering device 24a result in the formation of a tool cavity 26 in which the semifinished product arrangement 100a may be accommodated. In order to be able also in the longitudinal direction of the core layer 120 of such a semifinished product arrangement 100a to form an adaptation of the size of the tool cavity 106, volume limitation elements 28 are provided at two ends to the left and right of the tool cavity 26, which allow a flush fit of a semifinished product arrangement 100a in the tool cavity 26 in this direction, i.e. in the longitudinal direction LR.

On the upper side of the tool device 20, i.e. passing through the upper covering device 24a, connections of a matrix material feeding device 50 are represented. This feeding takes place from a matrix material storage container 40 via a valve in four different locations, so that the semifinished product arrangement 100a may be fed via the flowing aids 140 substantially continuously across the entire surface in the longitudinal direction LR and subsequently in the direction of thickness DR. Opposite thereto, i.e. in the lower reception device 22, a negative pressure device 60 is provided which performs a suction, i.e. a negative pressure generation, equally in four locations. Via a valve a compressor is connected which performs the evacuation of the tool cavity 26. In order to ensure during the process, i.e. in particular during heating up, that the internal volume of the tool cavity 26 is limited in the desired manner, a reinforcement carrier 32 is furthermore provided which is coupled by force-fit via two force transmission elements 36 with the upper covering device 24a. As soon as the upper covering device 24a attempts to deform on account of the internal pressure generated in the tool cavity 26 due to the expansion of the core layer 120, this is prevented by the support on the reinforcement carrier 32. The latter in turn is supported on Ständervorrichtungen 34 wherein it is mounted so as to be movable, in particular verfahrbar in rails, so that the upper covering device 24a may be moved upwards on the Ständervorrichtungen 34 for inserting the semifinished products 100a and for removing the finished sandwich structure panel 100 from the tool. The reception device 22 is advantageously als verfahrbar on rails and provided with a latching mechanism which is latched as soon as the reception device 22 has reached the position required for performing the method of the invention. Placing the upper covering device 24a by moving along the rails in the support devices 34 may take place only once the latching mechanism has latched, and thus the correct position of the reception device 22 has been confirmed.

In addition two temperature sensor devices 82 are provided, each one of which is arranged in either the reception device 22 or the upper covering device 24a. Both temperature sensor devices 82 are capable of recognizing the temperature of the reception device 22 or of the upper covering device 24a and relaying it to a temperature control device 80 via a signal line. This temperature control device 80 is connected to two fan openings 72 per heating source 70, so that in the event of continuous generation of heat in the heating source 70, the inner space of the manufacturing device 10 may be subjected to different intensities of heat by opening and closing the fan openings 72. Depending on what temperature is relayed by the temperature sensor devices 82 to the temperature control device 80, the supply of heat can be increased or reduced in this way.

In FIG. 11 a variant of the embodiment of FIGS. 1 to 3 is represented. In this variant the volume limiting device 24 is realized as an overpressure device 24b. In contrast with the upper covering device 24a, a configuration of the tool cavity 26 without play is not produced in this instant. Rather, an air space is purposely left above the semifinished product arrangement 100a or the flowing aids 140 and the arrangement of sheets 170. In this embodiment another arrangement of sheets, which is not represented for reasons of clarity, is disposed around the arrangement of sheets 170. The generation of negative pressure takes place between these two arrangements of sheets. The remaining air space thus is not in fluid-communicating connection with the negative pressure device 60. It is rather possible to create an overpressure in this air space, which opposes an expansion pressure of the core layer 120 of the semifinished product arrangement 1008 generated on account of a temperature increase. This embodiment is one possibility of performing the constant-volume method of the invention with a substantially open tool device. The overpressure device 24b may also be an autoclave or a pressing machine which is also capable of generating, in addition to the required overpressure, the desired temperature profiles.

REFERENCE SYMBOLS 10 manufacturing device
20 tool device
22 reception device
24 volume limitation device
24a upper covering device
24b overpressure device
26 tool cavity
28 volume limiting elements
30 stiffening device
32 longitudinal beam
34 support devices
36 force transmission device
40 matrix material storage container
50 matrix material feeding device
60 negative pressure device
70 heating source
72 fan openings
80 temperature regulation device
82 temperature sensor device
100 sandwich structure part
100a semifinished product arrangement
106 connection area
110 first skin layer
110a dry semifinished product tissue for the formation of the first skin layer
120 core layer
120a foam panel
120b foam panel
130 second skin layer
130a dry semifinished product tissue for the formation of the second skin layer
140 flowing aid
150 matrix material
160 reinforcement devices
170 arrangement of sheets
Aus curing phase
DR thickness direction of the core layer
Inf infusion phase
Kue cooling phase
LR longitudinal direction of the core layer
WF heat front
RT ambient temperature
Tem tempering step
$Temp_{Aus}$ curing temperature
$Temp_E$ temperature increasing portion
$Temp_H$ temperature holding portion
$Temp_{inf}$ infusion temperature
$Temp_V$ temperature decreasing portion
T1 first heating phase
T2 second heating phase

The invention claimed is:

1. A method for manufacturing a defect-free sandwich component, the method comprising:
inserting a semifinished product arrangement comprising two layers, each of which comprises at least one dry semifinished product tissue, and a closed-cell rigid foam between the two layers, as starting materials of the sandwich component in a tool device;
in a first heating phase, heating the semifinished product arrangement to an infusion temperature;
introducing a matrix material flowable at the infusion temperature in the semifinished product arrangement during an infusion phase;
in a second heating phase, stepwise increasing a temperature of the semifinished product arrangement to a curing temperature in partial steps so that each partial step presents a temperature increasing portion and a temperature holding portion so as to achieve a temperature equalization within the semifinished product arrangement;

during a curing phase, at least partially curing the matrix material before, during, and/or after the second heating phase to form skin layers comprising at least parts of the dry semifinished product tissues and a connection area for a full-surface connection of the closed-cell rigid foam and the skin layers, at least in portions thereof; and cooling the semifinished product arrangement to ambient temperature during a cooling phase, wherein the semifinished product arrangement is provided with a flowing aid and surrounded by an arrangement of sheets, and the matrix material is introduced into the semifinished product arrangement by negative pressure.

2. The method according to claim 1, wherein the negative pressure is introduced to an interior of the arrangement of sheets prior to introducing the matrix material so as to immobilize the semifinished product arrangement.

3. The method according to claim 1, further comprising introducing the matrix material into the semifinished product arrangement by overpressure.

4. The method according to claim 1, wherein a temperature reduction of the semifinished product arrangement in the cooling phase takes place stepwise in partial steps, so that each partial step includes a temperature reduction portion and a temperature holding portion in order to optimize a material relaxation within the semifinished product arrangement.

5. The method according to claim 1, wherein a peel ply is arranged between flowing aids and the dry semifinished product tissues provided to form the skin layers.

6. The method according to claim 1, wherein the closed-cell rigid foam is formed of at least one foam panel.

7. The method according to claim 1, wherein reinforcement devices for increasing damage tolerance are introduced into the closed-cell rigid foam.

8. A method for manufacturing a sandwich component having low inherent stress or having no inherent stress, the method comprising:

inserting a semifinished product arrangement surrounded by an arrangement of sheets and consisting of two layers of at least one dry semifinished product tissue each and a closed-cell rigid foam between these layers by at least one flowing medium into a reception device of a tool device, wherein arranging in a tool cavity formed in the tool device is performed such that a volume available for the semifinished product arrangement is limited by a volume limiting device until at least a curing phase;

in a first heating phase, heating the semifinished product arrangement to an infusion temperature and applying negative pressure to an inside of the enveloping arrangement of sheets while limiting the volume of the semifinished product arrangement;

during or after the first heating phase, introducing a matrix material flowable at the infusion temperature into the semifinished product arrangement during an infusion phase via flowing aids while maintaining the previously generated negative pressure and while limiting the volume of the semifinished product arrangement;

performing a temperature holding interval after the first heating phase until the introduction of the flowable matrix material while maintaining the previously generated negative pressure and while limiting the volume of the semifinished product arrangement has been concluded;

in order to at least partially cure the semifinished product arrangement during the curing phase before, during and/or after a second heating phase, further heating the semifinished product arrangement to a curing temperature which is higher than the infusion temperature, while maintaining the generated negative pressure and while limiting the volume of the semifinished product arrangement;

performing a temperature holding interval after the second heating phase while limiting the volume of the semifinished product arrangement; and cooling to ambient temperature during a cooling phase while limiting the volume the semifinished product arrangement.

9. The method according to claim 8, wherein the application of the negative pressure to the inside of the arrangement of sheets already takes place prior to the introduction of the flowable matrix material so as to immobilize the semifinished product arrangement.

10. The method according to claim 8, wherein the volume limitation device comprises at least one upper covering device which is placed on the reception device such that the tool cavity formed therebetween accommodates the semifinished product arrangement, the flowing aids, and the arrangement of sheets without play.

11. The method according to claim 8, wherein the volume limitation device comprises at least one overpressure device for temperature-dependent pressure control in which the reception device together with the semifinished product arrangement accommodated therein and the flowing aids as well as the arrangement of sheets is arranged, and that the semifinished product arrangement, the flowing aids, and the arrangement of sheets are subjected to a temperature-dependent overpressure during the process.

12. The method according to claim 8, wherein a temperature increase of the semifinished product arrangement at least in the second heating phase takes place stepwise in partial steps, so that each partial step includes a temperature increasing portion and a temperature holding portion in order to obtain a temperature equalization within the semifinished product arrangement.

13. The method according to claim 8, wherein a temperature reduction of the semifinished product arrangement in the cooling phase takes place stepwise in partial steps, so that each partial step includes a temperature reduction portion and a temperature holding portion in order to optimize a material relaxation within the semifinished product arrangement.

14. The method according to claim 8, wherein a peel ply is arranged between the flowing aids and the dry semifinished product tissues provided for the formation of skin layers.

15. The method according to claim 8, wherein the closed-cell rigid foam is formed of at least one foam panel.

16. The method according to claim 8, wherein reinforcement devices for increasing the damage tolerance are introduced into the closed-cell rigid foam.

17. The method according to claim 16, wherein the reinforcement devices are introduced along marginal portions of at least one foam panel.

18. The method according to claim 8, wherein inserting the semifinished product arrangement takes place at least with one closed-cell rigid foam cooled to a temperature below the ambient temperature.

* * * * *